(12) United States Patent
Altberg et al.

(10) Patent No.: US 9,203,974 B2
(45) Date of Patent: Dec. 1, 2015

(54) METHODS AND APPARATUSES FOR OFFLINE SELECTION OF PAY-PER-CALL ADVERTISERS

(75) Inventors: Ebbe Altberg, Mill Valley, CA (US);
Scott Faber, San Francisco, CA (US);
Ron Hirson, San Francisco, CA (US);
Sean Van Der Linden, Berkeley, CA (US)

(73) Assignee: YELLOWPAGES.COM LLC

( * ) Notice: Subject to any disclaimer, the term of this patent is extended or adjusted under 35 U.S.C. 154(b) by 1475 days.

(21) Appl. No.: 11/536,616

(22) Filed: Sep. 28, 2006

(65) Prior Publication Data

US 2007/0121844 A1    May 31, 2007

Related U.S. Application Data

(60) Provisional application No. 60/761,972, filed on Jan. 24, 2006.

(51) Int. Cl.
*G06Q 30/00* (2012.01)
*G05B 19/418* (2006.01)
*H04M 15/06* (2006.01)
(Continued)

(52) U.S. Cl.
CPC .............. *H04M 15/06* (2013.01); *G06Q 30/02* (2013.01); *G06Q 30/04* (2013.01); *H04M 15/00* (2013.01); *H04M 15/09* (2013.01); *H04M 15/41* (2013.01); *H04M 15/51* (2013.01); *H04M 15/56* (2013.01); *H04M 15/68* (2013.01); *H04M 15/8207* (2013.01); *H04M 3/2218* (2013.01); *H04M 3/4878* (2013.01); *H04M 2215/0164* (2013.01); *H04M 2215/0192* (2013.01); *H04M 2215/0196* (2013.01); *H04M 2215/202* (2013.01); *H04M 2215/54* (2013.01); *H04M 2215/66* (2013.01); *H04M 2215/7813* (2013.01)

(58) Field of Classification Search
USPC ........................................................... 705/14
See application file for complete search history.

(56) References Cited

U.S. PATENT DOCUMENTS

| 4,604,686 A | 8/1986 | Reiter et al. |
| 4,653,090 A | 3/1987 | Hayden |

(Continued)

FOREIGN PATENT DOCUMENTS

| KR | 20010086595 | 9/2001 |
| WO | 02088880 | 11/2002 |

OTHER PUBLICATIONS

"Interactive: Pick your superlative growth". Krantz, Michael. Mediaweek. vol. 5. Issue 35. pp. SS40. No. of pp. 1. Publication date Sep. 18, 1995. Publisher Emerald Expositions LLC. New York.*

(Continued)

*Primary Examiner* — Victoria Vanderhorst
(74) *Attorney, Agent, or Firm* — Alston & Bird

(57) ABSTRACT

Methods and apparatuses to connect telephone calls and track information about the telephone calls resulting from advertisements for groups of advertisers. In one embodiment, a method includes: receiving a telephone call at a second telephone number from a caller; connecting the telephone call to a first telephone number of a first entity who provides a price bid for a phone lead to be directed to the first telephone number of the first entity; where the first entity is to be billed for the telephone call connected to the first telephone number according to the price bid in response to a determination that the telephone is not a repeated telephone call from the caller to the first entity within a time period.

14 Claims, 23 Drawing Sheets

(51) Int. Cl.
*G06Q 30/02* (2012.01)
*G06Q 30/04* (2012.01)
*H04M 15/00* (2006.01)
*H04M 3/22* (2006.01)
*H04M 3/487* (2006.01)

(56) References Cited

U.S. PATENT DOCUMENTS

| | | |
|---|---|---|
| 4,677,659 A | 6/1987 | Dargan |
| 4,757,267 A | 7/1988 | Riskin |
| 4,788,718 A | 11/1988 | McNabb et al. |
| 4,817,129 A | 3/1989 | Riskin |
| 5,146,491 A | 9/1992 | Silver et al. |
| 5,339,358 A | 8/1994 | Danish et al. |
| 5,469,497 A | 11/1995 | Pierce et al. |
| 5,533,107 A * | 7/1996 | Irwin et al. ............... 379/201.01 |
| 5,659,742 A | 8/1997 | Beattie et al. |
| 5,793,851 A | 8/1998 | Albertson |
| 5,794,210 A | 8/1998 | Goldhaber et al. |
| 5,838,314 A | 11/1998 | Neel et al. |
| 5,937,390 A | 8/1999 | Hyodo |
| 5,943,416 A | 8/1999 | Gisby |
| 5,946,623 A * | 8/1999 | Spradlin ...................... 455/445 |
| 6,072,493 A * | 6/2000 | Driskell et al. ............... 715/854 |
| 6,108,493 A | 8/2000 | Miller et al. |
| 6,301,342 B1 * | 10/2001 | Ander et al. ............. 379/114.13 |
| 6,381,325 B1 | 4/2002 | Hanson |
| 6,418,214 B1 | 7/2002 | Smythe et al. |
| 6,460,036 B1 | 10/2002 | Herz |
| 6,461,162 B1 | 10/2002 | Reitman et al. |
| 6,504,920 B1 | 1/2003 | Okon et al. |
| 6,510,434 B1 | 1/2003 | Anderson et al. |
| 6,513,013 B1 | 1/2003 | Stephanou |
| 6,570,870 B1 | 5/2003 | Berstis |
| 6,691,093 B2 | 2/2004 | Shell |
| 6,732,183 B1 | 5/2004 | Graham |
| 6,807,571 B2 | 10/2004 | Hatano et al. |
| 6,839,737 B1 | 1/2005 | Friskel |
| 7,007,074 B2 | 2/2006 | Radwin |
| 7,013,280 B2 | 3/2006 | Davis et al. |
| 7,092,091 B2 | 8/2006 | Itoh et al. |
| 7,225,234 B2 | 5/2007 | Naqvi |
| 7,340,048 B2 | 3/2008 | Stern et al. |
| 7,428,497 B2 | 9/2008 | Agarwal et al. |
| 7,453,998 B2 | 11/2008 | Jacob et al. |
| 7,505,920 B2 | 3/2009 | Agarwal et al. |
| 7,548,915 B2 | 6/2009 | Ramer et al. |
| 7,689,466 B1 * | 3/2010 | Benbrahim et al. ......... 705/26.1 |
| 7,792,257 B1 | 9/2010 | Vanier et al. |
| 7,876,886 B2 | 1/2011 | Altberg et al. |
| 7,995,723 B2 | 8/2011 | Jacob et al. |
| 8,027,878 B2 | 9/2011 | Wong et al. |
| 8,209,225 B2 | 6/2012 | Altberg et al. |
| 8,233,608 B2 | 7/2012 | Oldach et al. |
| 8,239,273 B1 * | 8/2012 | Marshall et al. ............. 705/26.1 |
| 8,468,050 B2 | 6/2013 | Faber et al. |
| 8,521,596 B2 | 8/2013 | Altberg et al. |
| 8,724,789 B2 | 5/2014 | Altberg et al. |
| 2001/0029482 A1 | 10/2001 | Tealdi et al. |
| 2002/0069105 A1 | 6/2002 | do Rosario Botelho |
| 2002/0095331 A1 | 7/2002 | Osman et al. |
| 2002/0116256 A1 | 8/2002 | De Rafael et al. |
| 2002/0116266 A1 | 8/2002 | Marshall |
| 2002/0173319 A1 | 11/2002 | Fostick |
| 2003/0032410 A1 | 2/2003 | Saraswat |
| 2003/0033198 A1 | 2/2003 | Flannery et al. |
| 2003/0046161 A1 | 3/2003 | Kamangar et al. |
| 2003/0046198 A1 | 3/2003 | Knapp et al. |
| 2003/0078928 A1 | 4/2003 | Dorosario |
| 2003/0086556 A1 | 5/2003 | Welch et al. |
| 2003/0191693 A1 | 10/2003 | Aphek |
| 2003/0220866 A1 * | 11/2003 | Pisaris-Henderson et al. . 705/37 |
| 2004/0091093 A1 | 5/2004 | Bookstaff |
| 2004/0103024 A1 | 5/2004 | Patel et al. |
| 2004/0186778 A1 | 9/2004 | Margiloff et al. |
| 2004/0193740 A1 | 9/2004 | Kasmirsky et al. |
| 2004/0196833 A1 | 10/2004 | Dahan et al. |
| 2004/0199494 A1 | 10/2004 | Bhatt |
| 2004/0254859 A1 | 12/2004 | Aslanian |
| 2005/0074102 A1 | 4/2005 | Altberg et al. |
| 2005/0114208 A1 | 5/2005 | Arbuckle et al. |
| 2005/0216345 A1 | 9/2005 | Altberg et al. |
| 2006/0069610 A1 | 3/2006 | Rossini |
| 2007/0070980 A1 | 3/2007 | Phelps et al. |
| 2007/0100799 A1 | 5/2007 | Rose et al. |
| 2007/0121845 A1 | 5/2007 | Altberg et al. |
| 2007/0124290 A1 | 5/2007 | Swanson et al. |
| 2007/0162334 A1 | 7/2007 | Altberg et al. |
| 2007/0189473 A1 | 8/2007 | Altberg et al. |
| 2007/0248222 A1 | 10/2007 | Wolmuth |
| 2007/0253544 A1 | 11/2007 | Bookstaff |
| 2007/0280443 A1 | 12/2007 | Jacob et al. |
| 2008/0019496 A1 | 1/2008 | Taschereau |
| 2008/0060002 A1 | 3/2008 | Noll et al. |
| 2008/0187114 A1 | 8/2008 | Altberg et al. |
| 2009/0041227 A1 | 2/2009 | Altberg et al. |
| 2009/0060148 A1 | 3/2009 | Jacob et al. |
| 2009/0067599 A1 | 3/2009 | Agarwal et al. |
| 2009/0158334 A1 | 6/2009 | Rodriguez et al. |
| 2010/0205058 A1 | 8/2010 | Ji et al. |
| 2011/0137754 A1 | 6/2011 | Fernandez |
| 2013/0012158 A1 | 1/2013 | Altberg et al. |
| 2013/0103503 A1 | 4/2013 | Zhang et al. |
| 2013/0311261 A1 | 11/2013 | Faber et al. |
| 2013/0325635 A1 | 12/2013 | Altberg et al. |

OTHER PUBLICATIONS

International Application No. PCT/US04/15238, Written Opinion and International Search Report, Aug. 29, 2005.

USPTO Transaction History of U.S. Appl. No. 10/679,982, filed Oct. 6, 2003, entitled "Method and Apparatus to Provide Pay-Per-Call Performance Based Advertising," now U.S. Pat. No. 7,120,235.

USPTO Transaction History of U.S. Appl. No. 10/956,571, filed Oct. 1, 2004, entitled "Method and System to Connect Consumers to Information."

USPTO Transaction History of U.S. Appl. No. 10/956,771, filed Oct. 1, 2004, entitled "Method and System to Connect Consumers to Information."

USPTO Transaction History of U.S. Appl. No. 11/092,309, filed Mar. 28, 2005, entitled "Method and Apparatuses for Offline Selection of Pay-Per-Call Advertisers," now U.S. Pat. No. 7,366,683.

USPTO Transaction History of U.S. Appl. No. 11/536,624, filed Sep. 28, 2006, entitled "Methods and Apparatuses for Offline Selection of Pay-Per-Call Advertisers via Visual Advertisements."

USPTO Transaction History of U.S. Appl. No. 11/691,372, filed Mar. 26, 2007, entitled "Methods and Systems to Connect Consumers to Information."

USPTO Transaction History of U.S. Appl. No. 11/733,751, filed Apr. 10, 2007, entitled "Systems and Methods to Collect Information Just in Time for Connecting People for Real Time Communications."

USPTO Transaction History of U.S. Appl. No. 12/062,425, filed Apr. 3, 2008, entitled "Methods and Apparatuses for Offline Selection of Pay-Per-Call Advertisers."

USPTO Transaction History of U.S. Appl. No. 12/128,571, filed May 28, 2008, entitled "Systems and Methods to Connect People for Real Time Communications via Directory Assistance."

USPTO Transaction History of U.S. Appl. No. 12/240,807, filed Sep. 29, 2008, entitled "Methods and Systems to Connect Consumers to Information."

ISA/US, International Search Report for International Application No. PCT/US05/12061, 3 pages, Nov. 17, 2006.

European Patent Office, Search Report for European Patent Application No. EP06837584.9, Nov. 4, 2010.

CCBN, Inc. "Full Year 2003 and Q4 Ebookers PLC Earnings Conference Call—Part 2," Fair Disclosure Wire, Mar. 22, 2004.

(56) References Cited

OTHER PUBLICATIONS

EP Application No. 05745756.6, Examination Report, Jan. 28, 2010.
International Application No. PCT/US05/15645, Written Opinion and International Search Report, Feb. 5, 2007.
International Application No. PCT/US01/48284, International Preliminary Examination Report, Aug. 9, 2002.
International Application No. PCT/US07/08968, Written Opinion and International Search Report, Nov. 15, 2007.
Rose, D.E. et al., "Understanding User Goals in Web Search," Proceedings of the 13th Int'l Conference on World Wide Web, pp. 13-19, May 17-20, 2004.
EP Application No. 05745704.6, Examination Report, Feb. 1, 2010.
International Application No. PCT/US05/15646, Written Opinion and International Search Report, Jan. 29, 2007.
International Application No. PCT/US06/44216, Written Opinion and International Search Report, Oct. 17, 2007.

* cited by examiner

CALL HANDLING MODULE
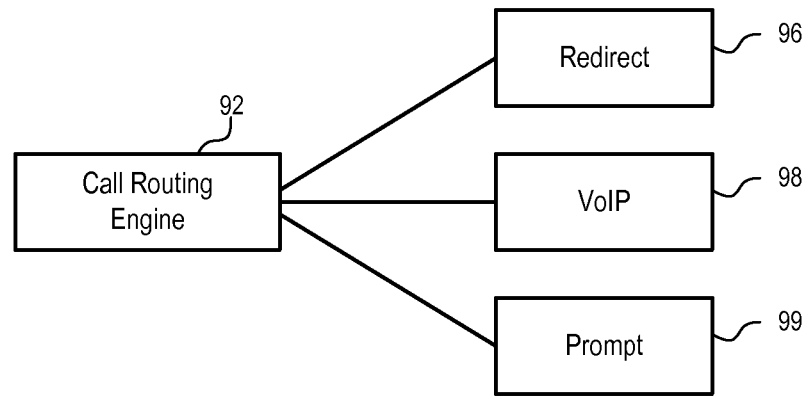
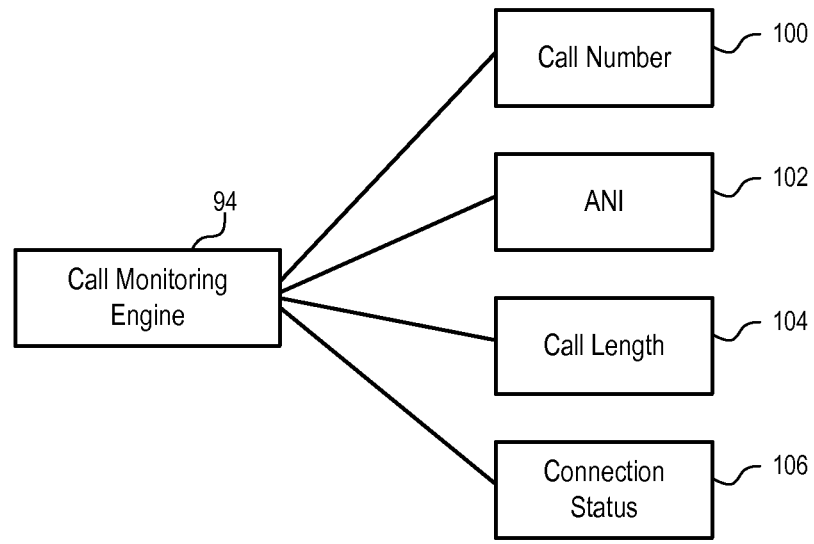
FIG. 7

Create you ad by entering a headline, two lines of description and a phone number Example:

Bert's Plumbing
Best Plumbers in San Francisco
800-555-5407
Interest ▭

To maximize your conversion rate and your ad's position, be as specific as possible in the description lines, and be sure you meet the requirements for ad format and content listed in the Editorial Guidelines Headline (maximum 26 characters)
[Bert's Plumbing]
Description line 1 (maximum 36 characters)
[Best Plumber in San Francisco!]
Description line 2 (maximum 36 characters)
[24/7/365. Guaranteed cheapest rates]
Phone number
[415-555-6823]

[Create Ad & Continue >>]

- Create an account on ingenio
- Create ad (see left)
- Determine keywords and geography (city, state, zip, etc.)
- Determine bid amounts daily budget
- Launch campaign
- Unique 800# is automatically generated and rendered in advertisement. 800# redirects to LONON's actual phone number
- LONON pays for each phone call received

SCROLL DOWN to see more listings    Refine your search by Zip Code:

Your search found 105 listings, Listings 1 to 15 listed below ...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS     scroll down for more listings

Dream Car Rentals                                Cite Gold
3734 Las Vegas Blvd.
LAS VEGAS, NV
Phone: (702) 555-6661
Fax: (702) 555-6665
We Specialize in Excitement! Ferrari's. Viper's Porsche's & Hummers. Harley-Davidson's and SUV's "DRIVE THE DREAM"

Cite Gold

RENT-A-VETTE
5021 SWENSON STREET
LAS VEGAS, NV 89119
Phone: (702) 555-2692
Fax: (702) 555-2044

ONLINE LISTINGS                 scroll down for more listings

Expedia: For All Your Car Rental Needs  http://www.expedia.com
Save with Expedia.com, your one-stop source for flights, hotels, vacation packages, cruises, and rental

METHODS AND APPARATUSES FOR OFFLINE SELECTION OF PAY-PER-CALL ADVERTISERS

The present application claims priority to Provisional U.S. Patent Application Ser. No. 60/761,972, filed Jan. 24, 2006, the disclosure of which is incorporated herein by reference.

The present patent application is related to: U.S. patent application Ser. No. 11/077,655, filed Mar. 10, 2005 and claimed priority from Provisional U.S. Patent Application 60/653,708 filed on Feb. 16, 2005, Provisional U.S. Patent Application Ser. No. 60/568,156 filed on May 4, 2004, Provisional U.S. Patent Application Ser. No. 60/560,926 filed on Apr. 9, 2004 and Provisional U.S. Patent Application Ser. No. 60/552,124 filed on Mar. 10, 2004; U.S. patent application Ser. No. 11/092,309, filed Mar. 28, 2005 and claimed priority from Provisional U.S. Patent Application 60/653,660 filed on Feb. 16, 2005; U.S. patent application Ser. No. 11/095,853, filed Mar. 30, 2005 and claimed priority from Provisional U.S. Patent Application 60/653,661 filed on Feb. 16, 2005; U.S. patent application Ser. No. 11/014,073, filed Dec. 15, 2004; U.S. patent application Ser. No. 10/872,117, filed Jun. 17, 2004; U.S. patent application Ser. No. 11/021,939, filed Dec. 23, 2004; U.S. patent application Ser. No. 10/679,982, filed Oct. 6, 2003. The disclosures of the above referenced related applications are incorporated herein by reference.

TECHNOLOGY FIELD

At least some embodiments of the present invention relate to telephonic connections and advertising in general and performance-based advertising in particular.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in the traditional performance-based advertising, as described above.

SUMMARY OF THE DESCRIPTION

Methods and apparatuses to connect telephone calls and track information about the telephone calls resulting from advertisements for groups of advertisers are described here. Some embodiments of the present invention are summarized in this section.

In one embodiment, a method includes: determining a geographic area after receiving a telephone call to a first telephone number publicized in an advertisement; determining a telephone number of a first advertiser; and connecting the telephone call to the telephone number of the first advertiser, the first advertiser billed for the advertisement based on telephonic connections made to connect the first advertiser and telephone calls to the first telephone number.

In one embodiment, a method includes: receiving a telephone call at a second telephone number from a caller; connecting the telephone call to a first telephone number of a first entity who provides a price bid for a phone lead to be directed to the first telephone number of the first entity; where the first entity is to be billed for the telephone call connected to the first telephone number according to the price bid in response to a determination that the telephone is not a repeated telephone call from the caller to the first entity within a time period.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 7 illustrates the Call Handling Module of the system, in greater detail.

FIG. 8A shows an example of a user interface that may be presented to a user during advertisement creation, in accordance with one embodiment of the present invention.

FIG. 9 shows an example of a search engine result page, which includes an advertisement generated, in accordance with one embodiment of the present invention.

FIG. 10 shows an example of an email alert that is sent to an advertiser, when a call is generated, in accordance with one embodiment of the invention.

DETAILED DESCRIPTION

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
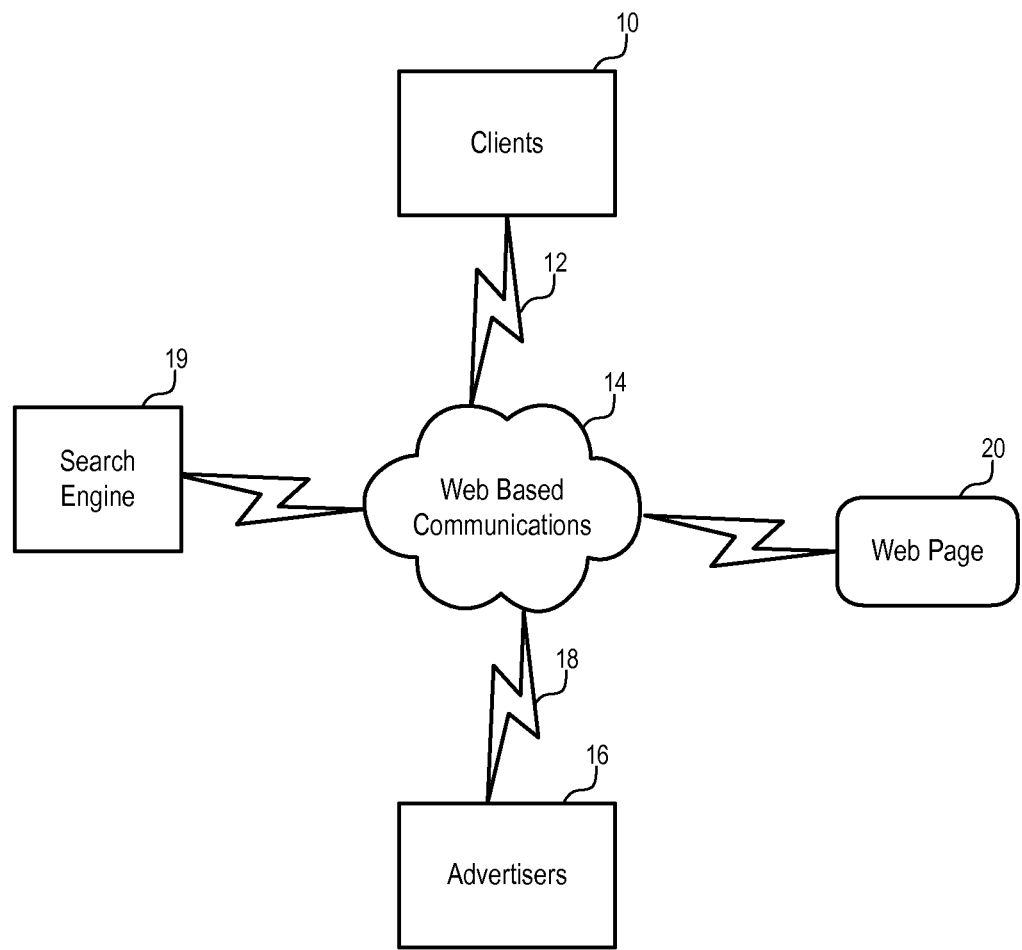
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
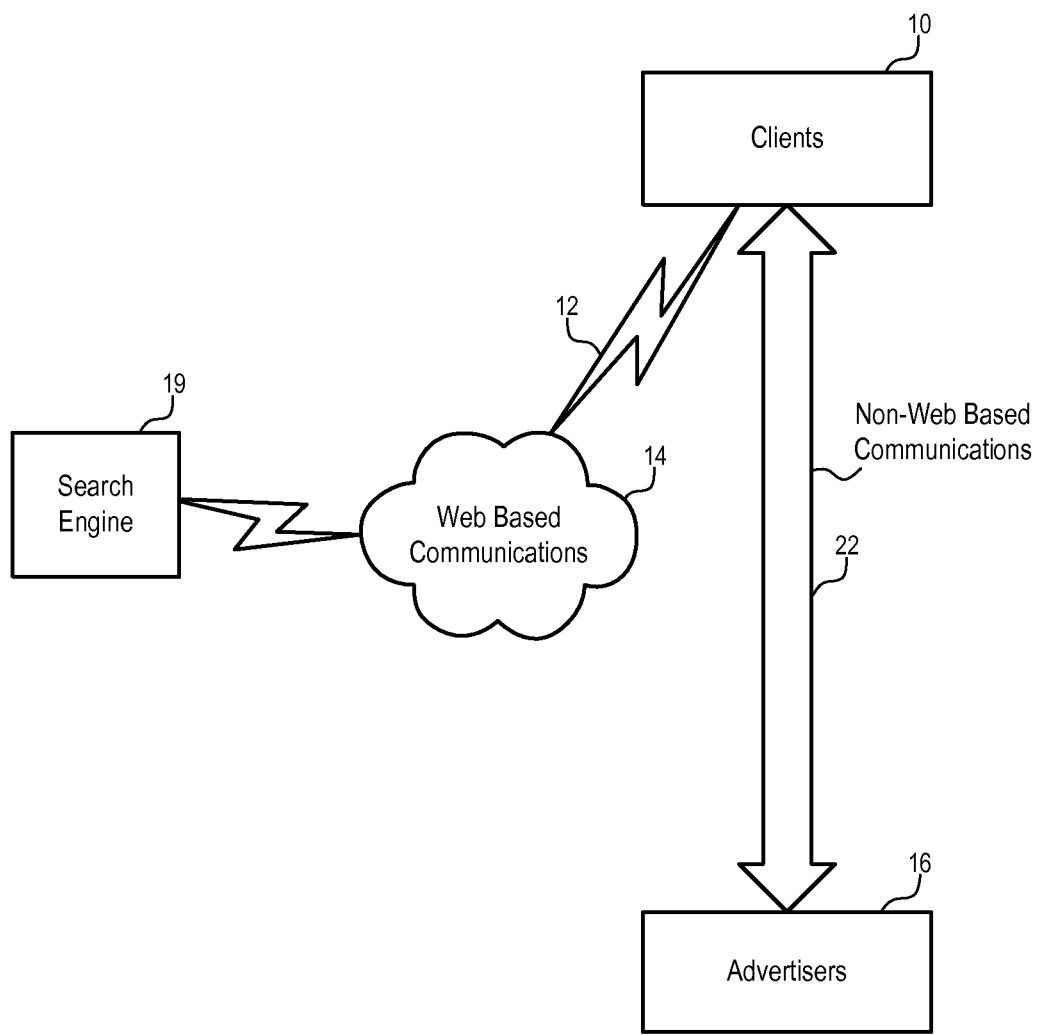
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, VoIP clients, etc.

Figure 3:
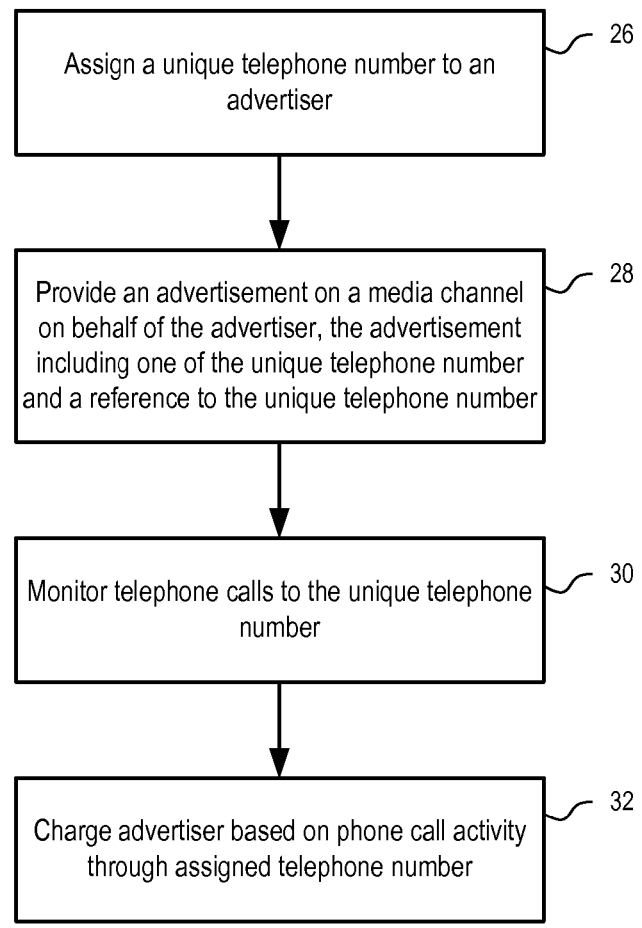
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
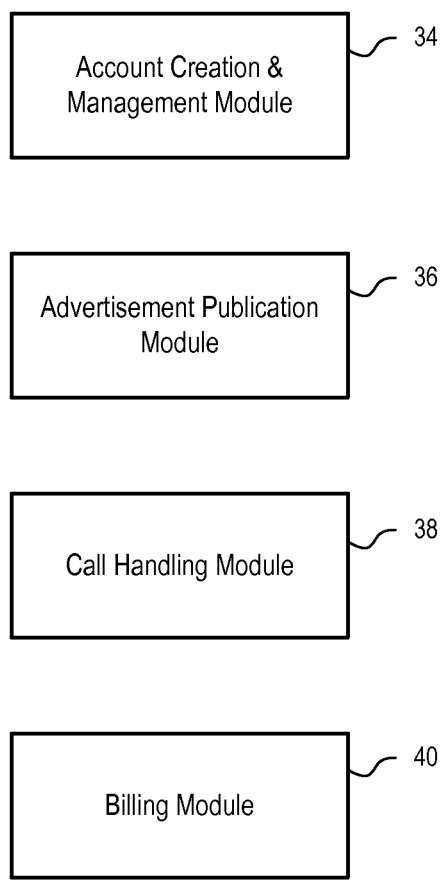
FIG. 4 shows a high level functional description of a system in accordance with one embodiment of the present invention.

FIG. 4 of the drawings shows a functional description of a system to implement the method of FIG. 3. Referring to FIG. 4, the system includes account creation and management module 34, advertisement publication module 36, call handling module 38, and billing module 40. In alternative embodiments, additional, less, or different modules may be included in the system without departing from the invention.

Figure 5:
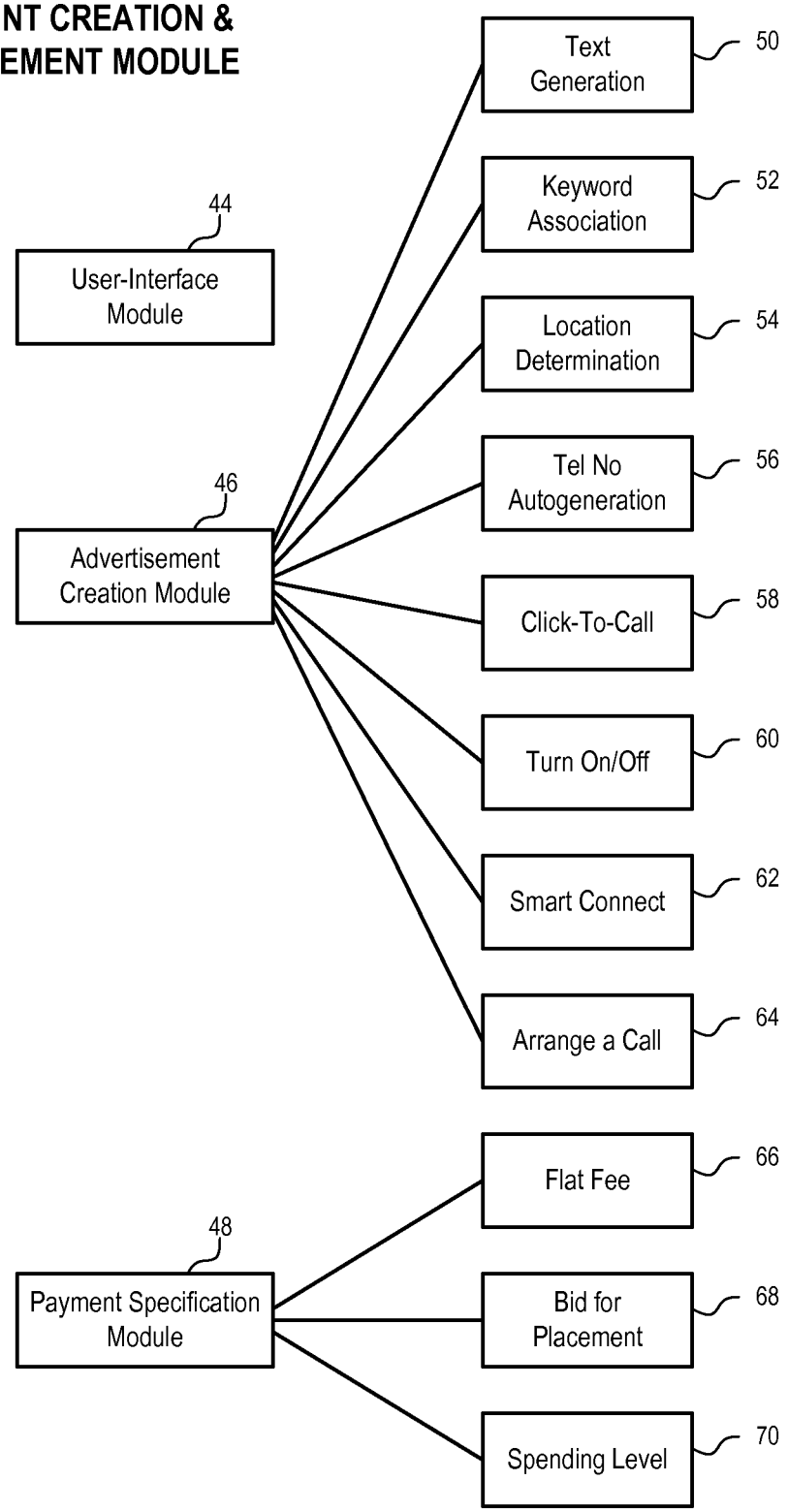
FIG. 5 illustrates the Account Creation and Management module of the system, in greater detail.
Figure 8B:
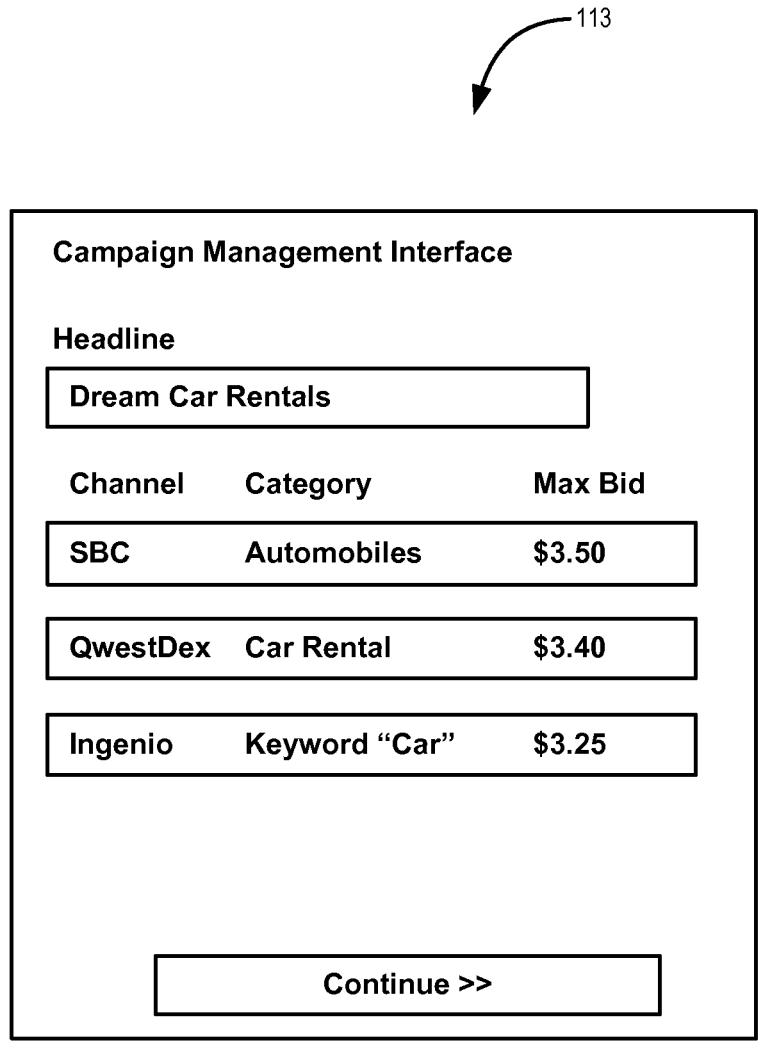
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will be displayed to clients searching within the San Francisco area.

In one embodiment, the module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number is generated or selected from a pool of numbers at the time the advertisement is created; alternatively, the telephone number is generated or selected at the time the advertisement is being requested for display. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1 800 YEL PAGES-1234, the call will be automatically routed to Burt's telephone as will be described in more detail below.

In one embodiment, the telephone number (e.g., a traditional telephone number with or without an extension, or a VoIP-based telephone reference, such as a Session Initiation Protocol (SIP) address) is automatically generated or selected at the time the advertisement is being requested for display. Alternatively, the telephone number assigned to the advertiser is generated or selected at the time the system accepts the submission of the advertisement from the advertiser. Alternatively, the telephone number assigned to the advertiser is generated or selected at the time the advertisement is being activated for publication via the system.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then tries cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory, or keyword. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account. Alternatively, Burt may provide payment information (e.g., a credit card number or bank account) to the system such that the system can automatically transfer additional funds, when needed, to his account according to the payment information.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the system.

Figure 6:
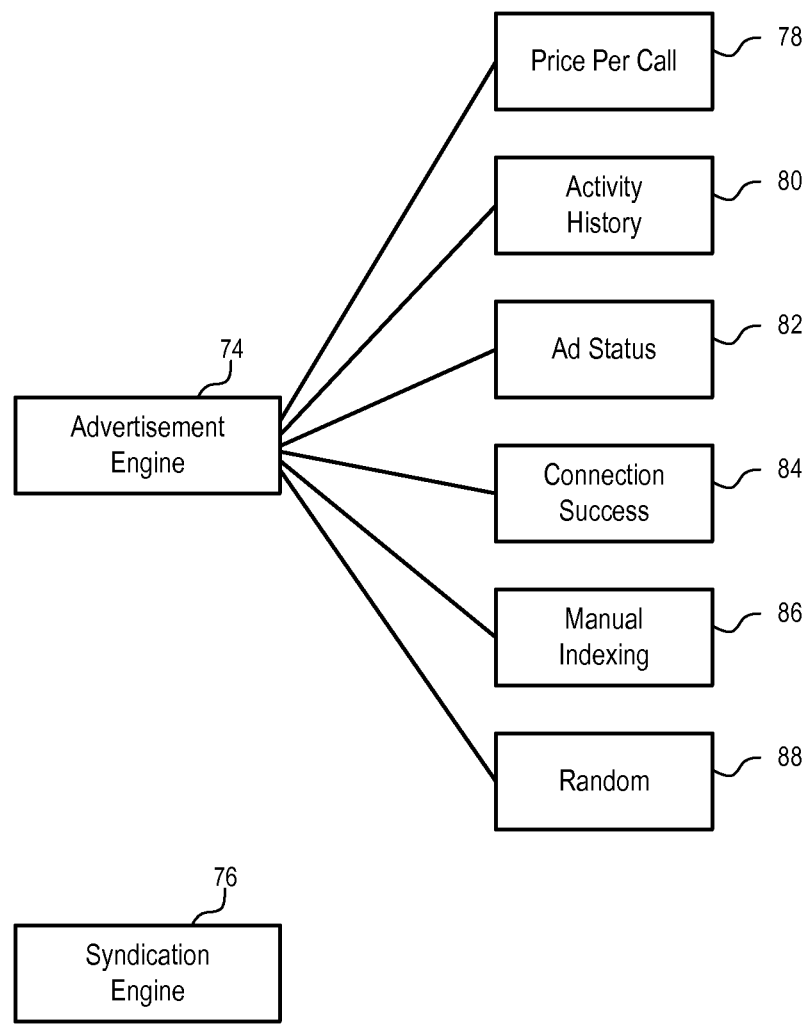
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement engine 74, and an advertisement syndication engine 76. The purpose of the advertisement engine 74 is to automatically provide Burt's advertisement on a particular channel. In some embodiments, the advertisement engine 74 causes a campaign management interface 113 (see FIG. 8B of the drawings) to be displayed to an advertiser. The interface 113 allows the advertiser to optionally choose a channel, e.g., Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately provided. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
|---|---|---|
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement engine 74 without departing from the invention.

In one embodiment, an advertisement engine 74 further includes one or more modules for searching advertisements according to a query request, sorting advertisements, allocating real time communication references (e.g., traditional telephone numbers, SIP address, user ID of instant messaging system, etc.).

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
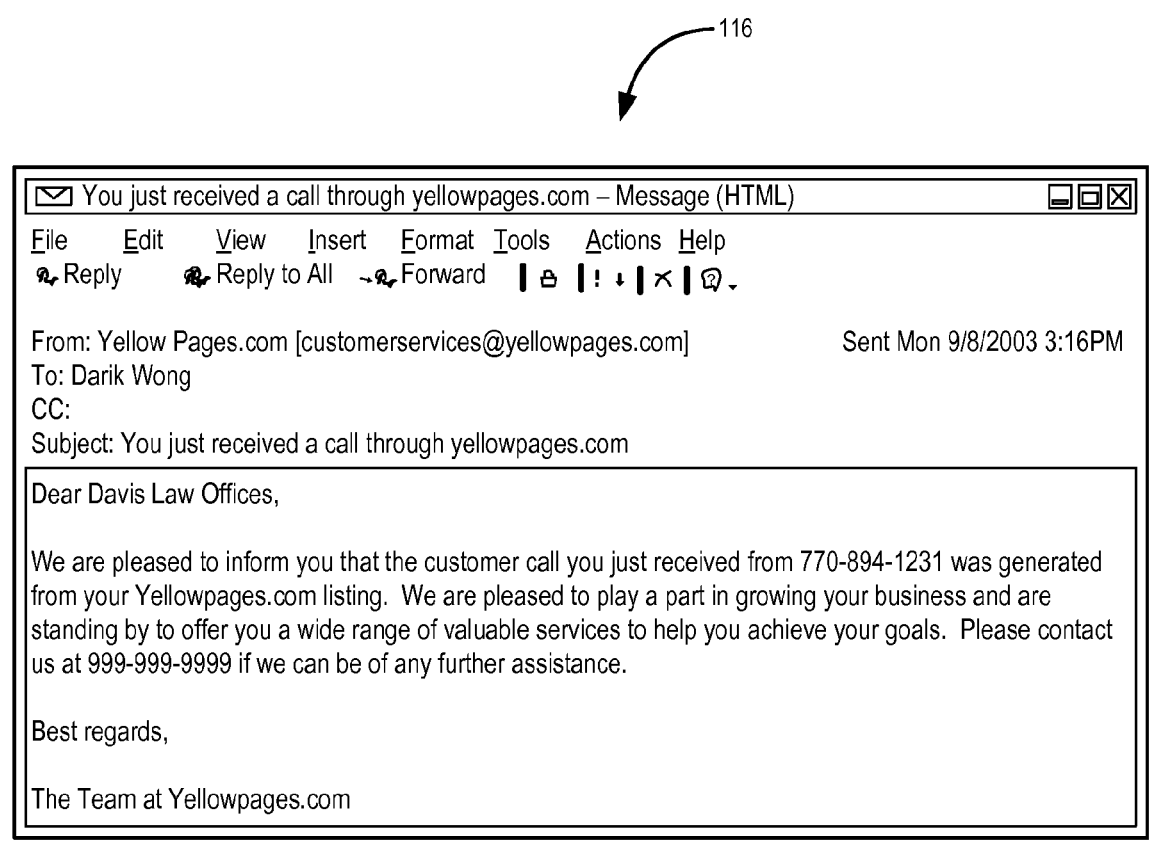

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100 106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
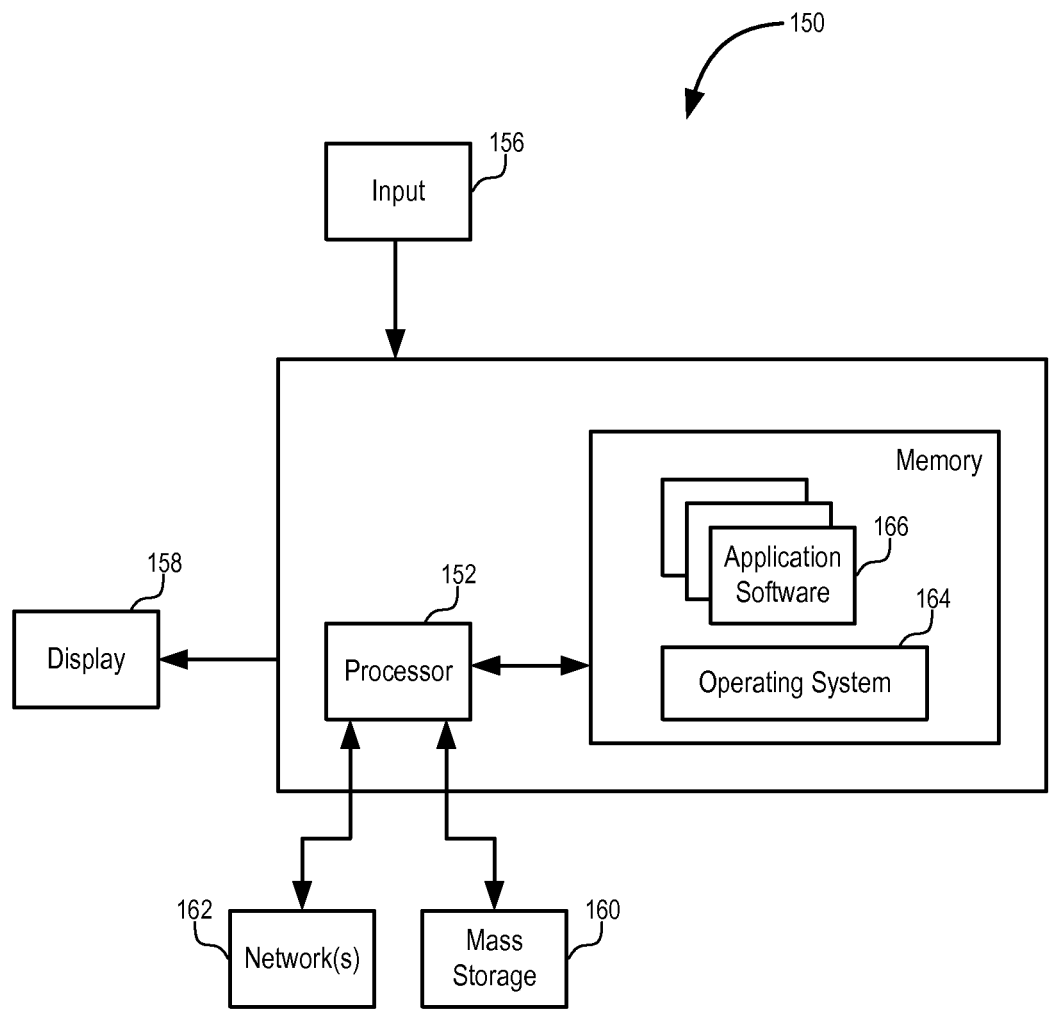
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to the memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. These demand partners (also referred to herein as syndication partners) can receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
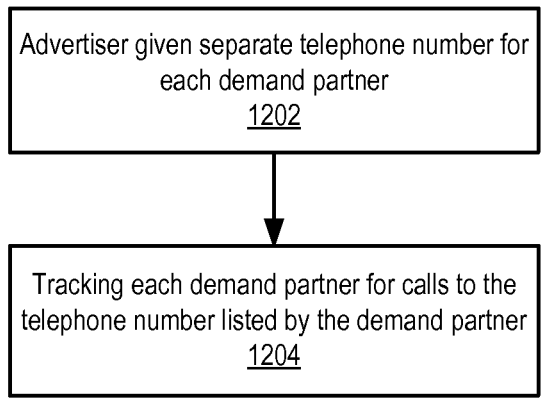
FIGS. 12-18 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
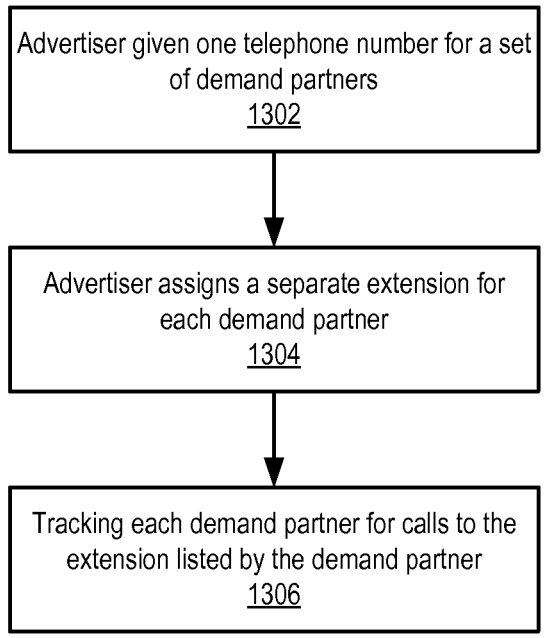

In another embodiment, described in the flow diagram of FIG. 13, in process 1302 an advertiser receives a singlelbase (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new—cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
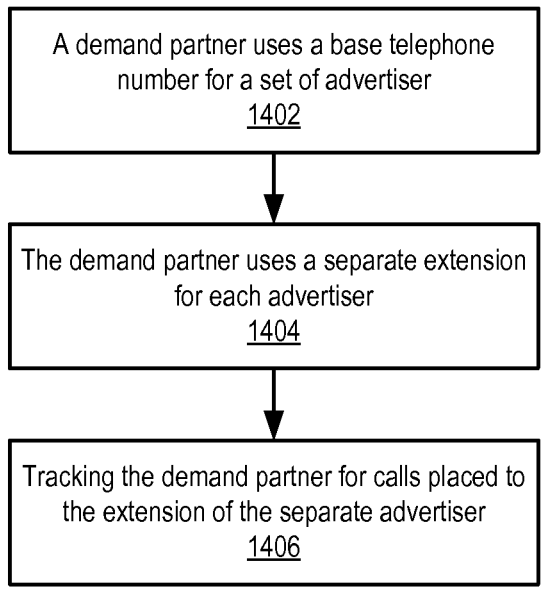

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
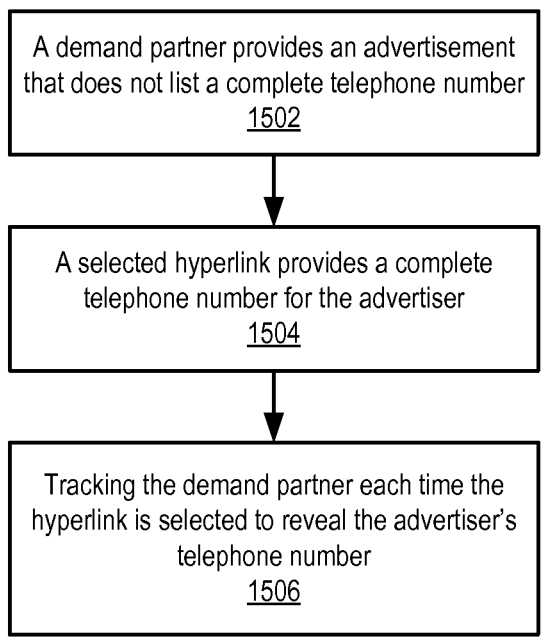

According to another embodiment, a click-to-reveal method is proposed, as described in co-pending U.S. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the advertisement engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
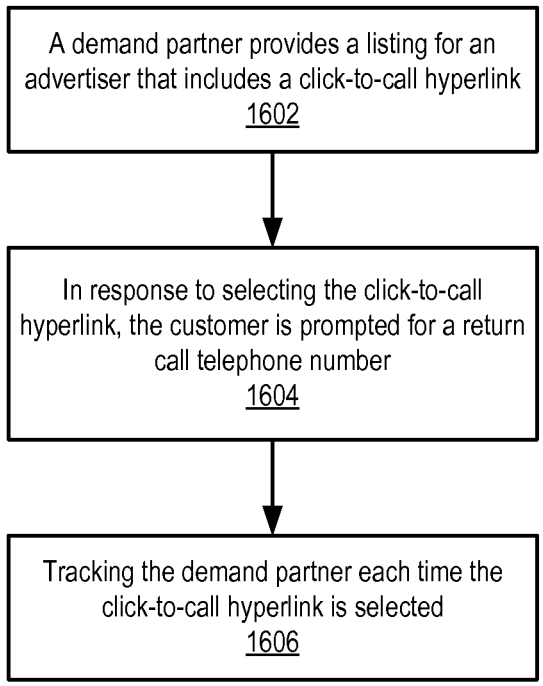

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link (e.g., a hyperlink, or an icon, or a button) is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
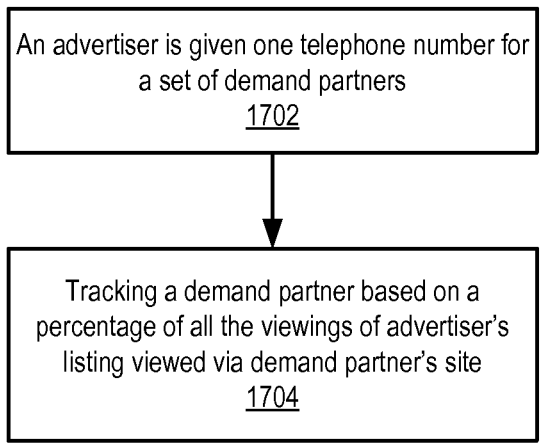

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
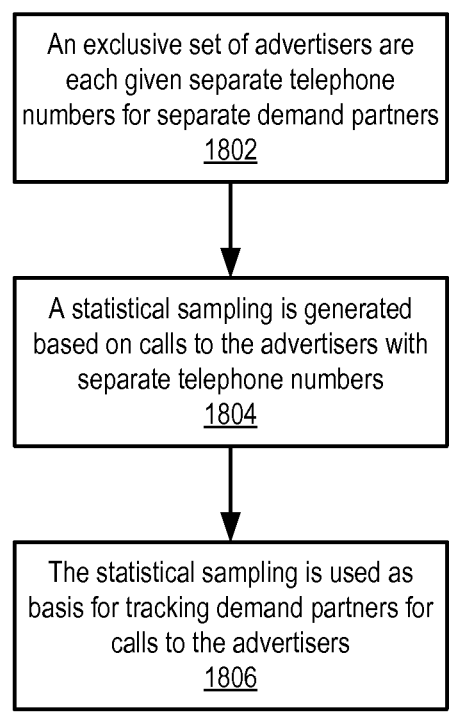

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are each give a unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers.

By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory/publisher.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that described in U.S. patent application Ser. No. 10/872,117, filed Jun. 17, 2004, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

In one embodiment, not only is it designed to track the number of calls and precise time of calls, but the demand source at which the caller viewed the advertisement may also be tracked. Online directories can have many different external web sites through which they syndicate the same advertisers, and it can be useful to know from which web site the phone call originated so that, in some cases, the directory can compensate the external web site for having brought customers. Provisional U.S. Patent Application Ser. No. 60/560,926, filed on Apr. 9, 2004, outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time/duration of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

In one embodiment, the unique telephone numbers assigned to an advertiser and or a demand partner is for a short period of time after the listing of the advertiser containing the unique telephone numbers is presented. After the time period, the telephone numbers can be re-assigned to other advertisers.

Figure 19:
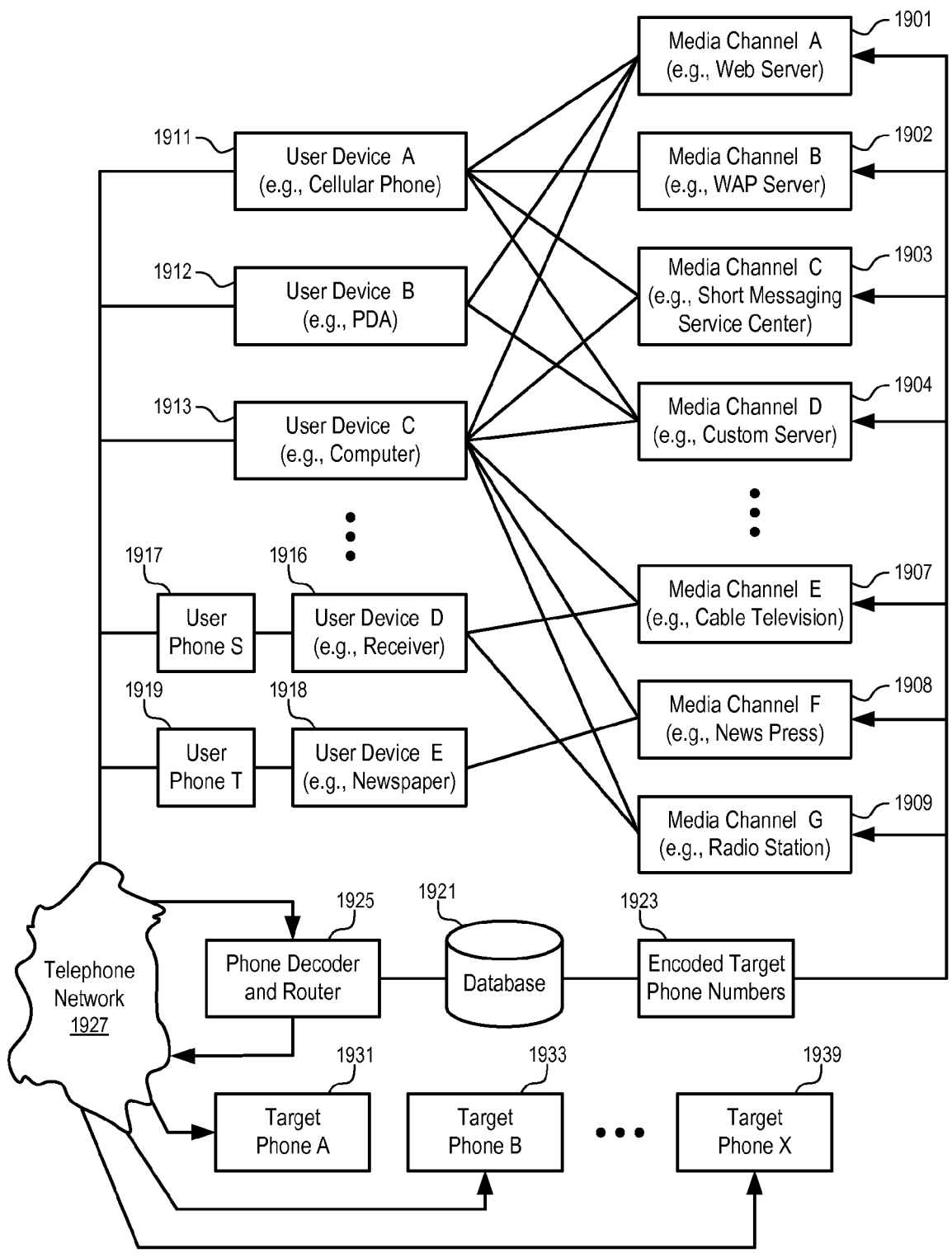
FIG. 19 shows a diagram of a system to make and track phone connections according to one embodiment of the present invention.

FIG. 19 shows a diagram of a system to make and track phone connections according to one embodiment of the present invention.

In FIG. 19, a database (1921) may contain the phone numbers of target phone A (1931), target phone B (1933), . . . , target phone X (1939), etc. Typically, the target phones belong to the institutions, businesses, individuals, etc, which seek for publicity through various media channels, such as media channel A (1901) (e.g., web server), media channel B (1902) (e.g., WAP server), media channel C (1903) (e.g., short messaging service center), media channel D (1904) (e.g., custom server), media channel E (1907) (e.g., cable television), media channel E (1908) (e.g., news press), media channel G (1909) (e.g., radio station), etc.

In one embodiment of the present invention, the phone numbers of the target phones are not directly publicized over the media channels. Instead, encoded target phone numbers (1923) are used. Using the encoded target phone numbers (1923), a user cannot reach target phones directly. The encoded target phone numbers (1923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (1911) (e.g., cellular phone), user device B (1912) (e.g., personal digital assistant (PDA)), user device C (1913) (e.g., computer), user device D (1916) (e.g., receiver), user device E (1918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (1917) or user phone T (1919).

In one embodiment of the present invention, dialing at least a portion of an encoded target phone number connects the phone call to a phone decoder and router (1925) first. According to the encoded target phone number dialed, the phone decoder and router (1925) determines the corresponding target phone number using the database (1921) and connects the phone call to the corresponding target phone (e.g., one of target phones 1931-1939) through the telephone network (1927).

Note the telephone network (1927) may be circuit switched, packet switched, or partially circuit switched and partially packet switched. For example, the telephone network may partially use the Internet to carry the phone call (e.g., through VoIP). For example, the connection between the user phone/device and the phone decoder and router (1925) may be carried using VoIP; and the connection between the phone decoder and router (1925) may be carried using a land-line based, circuit switched telephone network.

In one embodiment of the present invention, the information associated with the encoded target phone number, such as the media channel used to provide the encoded target phone number to the users, is also decoded/retrieved using the database (1921). Thus, the information associated with the encoded target phone number can be tracked/stored.

In one embodiment, the phone decoder and router (1925) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (1925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (1925) through the telephone network (1927); and a second portion of the encoded target phone number is to be decoded by the phone decoder and router (1925). For example, the Dual Tone Multi-Frequency (DTMF) decoder can be installed in the phone decoder and router (1925) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment of the present invention, a single telephone number is used to reach the phone decoder and router (1925) for different target phone numbers; and the portion of the encoded target phone number that is used to reach the phone decoder and router (1925) is not used in determining the information associated with the encoded target phone number.

Alternatively, multiple telephone numbers can be used to reach the phone decoder and router (1925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (1921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (1925). When such a mapping scheme is used, a look up table is not necessary. For example, an encoded target phone number may include a first portion that is the phone number of the phone decoder and router (1925), a second portion that is the target phone number appended with a number mapped from an identifier of the media channel. To prevent the user from dialing the target phone number directly, an encryption/scrambling scheme can be used to encode the second portion, which is decoded at the phone decoder and router (1925).

In one embodiment of the present invention, the phone decoder and router (1925) determines the target phone number from the encoded target phone number dialed by the user and then dials the target phone number for the user and joins/bridges the phone calls so that the user can talk to the target phone.

In one embodiment of the present invention, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (1925), pauses for a short period of time for the phone decoder and router (1925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join/bridge the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment of the present invention, an advertisement is presented to end users around the globe without geographical area limitations. For example, an advertiser may provide services and/or products to customers around the globe. The advertisement may be delivered to the worldwide users of the Internet.

In one embodiment of the present invention, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment of the present invention, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment of the present invention, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment of the present invention, an advertisement is presented in a media channel for a group of advertisers, such as a group of mortgage brokers. The advertisement contains an encoded target phone number which is reachable to the group of mortgage brokers. When the encode target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Offline Selection Examples

Figure 20:
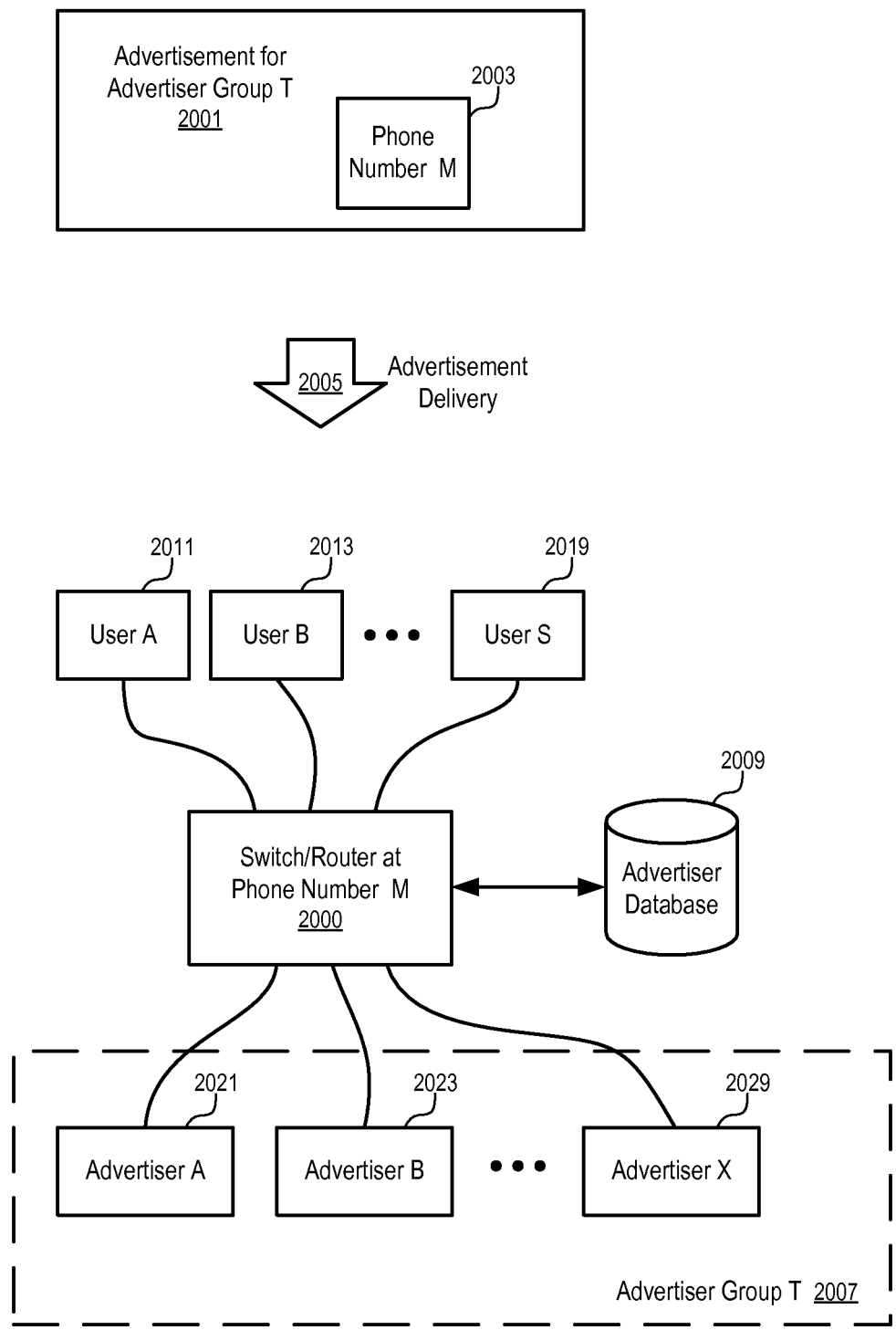
FIG. 20 shows a diagram of a system to make offline selection of advertisers according to one embodiment of the present invention.

FIG. 20 shows a diagram of a system to make offline selection of advertisers according to one embodiment of the present invention.

In FIG. 20, the advertisement (2001) is for an advertiser group T (2007) which includes a number of different advertisers, such as advertiser A (2021), advertiser B (2023), advertiser X (2029), etc. For example, the advertisers of the group may offer the same types of services or products under similar terms and/or prices. Thus, a unified advertisement can be presented on behalf of the entire group. The advertisement delivery (2005) can be in any of the forms known in the art. For example, the advertisement can be delivered through newspaper, radio, television, yellow book, listing service, web search engine, web site banner, WAP, SMS, etc. The advertisement contains phone number M (2003) for the users to initiate a phone call to reach one of the advertisers.

In one embodiment, the advertised phone number (e.g., 2003) can also contain extension digits in addition to toll-free digits. In one embodiment, the extension digits are used to convey additional information such as geography, category, or the ability to trace specific advertising creative (e.g., the call resulted from the advertisement on the billboard on Second Street). In one embodiment, dialing of the extension digits (or some of the extension digits) is optional; if the extension digits are not dialed, the call goes through anyway; and the information corresponding to the extension digits is not collected (or, similar information is extracted/extrapolated from other data sources, such as the phone number from which the call is initiated, etc.).

In one embodiment of the present invention, the phone number M (2003) is not specifically for a particular advertiser at the time the advertisement is presented. Thus, at the time the user initiates the phone call, the target advertiser is yet to be determined. The selection of a particular target advertiser is after the initiation of the phone call.

In one embodiment of the present invention, a switch/router (2000) at the phone number M is used to connect the users to the advertisers dynamically according to the information in the advertiser database (2009). When a user, such as user A (2011), user B (2013), user S (2019), etc., calls the phone number M (2003), the user is connected to the switch/router (2000) first. With or without further user input, the switch/router (2000) connects the call to an advertiser, such as advertiser A (2021), advertiser B (2023), advertiser X (2029), etc. The advertiser is charged based on the telephone calls generated for the advertiser. In one embodiment, the selection of the advertiser is made at the switch/router after the user phone call is received. The switch/router may operate via switching circuits or changing communication data packets.

Alternatively, information about the user phone number and the desire to make the phone call according to the advertised phone number can be transmitted to the switch/router through a communication link other than a phone connection. For example, an email, a fax, an HTTP (HyperText Transfer Protocol)/WAP(Wireless Application Protocol) request, etc., can be used to submit the request for the phone connection. The switch/router then initiates the phone call to the user and the phone call to the selected winning advertiser and bridges the two calls.

Note that the phone number M (2003) may also be encoded in a way so that the information about the media channel which provides the phone number to the user can be decoded, as discussed above. For example, different media channels may be assigned different phone numbers for reaching the same group of advertisers through the switch/router (2000). According to the phone number in the advertisement, the switch/router (2000) can determine the media channel that is creditable for the delivery of the phone number to the users.

In one embodiment of the present invention, a winning advertiser is selected according to the bidding for advertisement. The highest bidder wins the telephone call. The advertisers may adjust their bids anytime through any communication media to balance their chances to get a call resulting from the advertisement and the cost for the advertisement. For example, the advertisers may change their bids through a web site that is connected to the advertiser database, through an email to representatives or automatic email gateways of the advertiser database, through a phone call, a fax, a letter, etc.

Alternatively, the set of highest bidders may be determined; and the calls resulting from the advertisement are distributed to the set of highest bidders in frequencies that are proportional to their bid amounts. Alternatively, one from the set of highest bidders is further selected according other criteria, such as the geographic distance from the advertisers to the callers. Alternatively, other criteria, such as the matching of geographic service area to the location of the callers, are used to select a set of candidates; and the candidates are then ranked according to the prices specified by the advertisers for the pay for performance advertisement, where the performance is measured in terms of phone calls resulting from the advertisement.

In one embodiment, the availability of the advertisers to answer the call is also considered. In one embodiment, if the top-ranking (e.g., according to the bidding) advertiser receives a call and doesn't pick up after a certain amount of time (e.g. 30 seconds), the call is automatically routed to the second-highest ranking advertiser, and so on. In another embodiment, the missed call is routed to a human concierge who transfers the call to the appropriate available advertiser or information source.

In one embodiment, the advertiser group includes subgroups of advertisers for different geographic areas. Indications of geographic areas of interest to the callers can be used in the selection process.

In one embodiment, the selection of the geographic area is made when the user selects the phone number from the advertisements. The phone number is encoded with geographic area information such that, when the phone number is dialed, the geographic area information can be automatically decoded from the phone number dialed; and the geographic area information can be used to rank the advertisers and/or eliminate the advertisers that are not for the corresponding geographic areas.

In one embodiment, the geographic area information is determined from the location of the user phone. Alternatively, the user may specify the geographic area in the phone call to the switch/router (2000), through an automated system or through human concierges. Further, the user may specify requirements other than geographic areas for selecting the winning advertiser. Further details are provided below.

Figure 21:
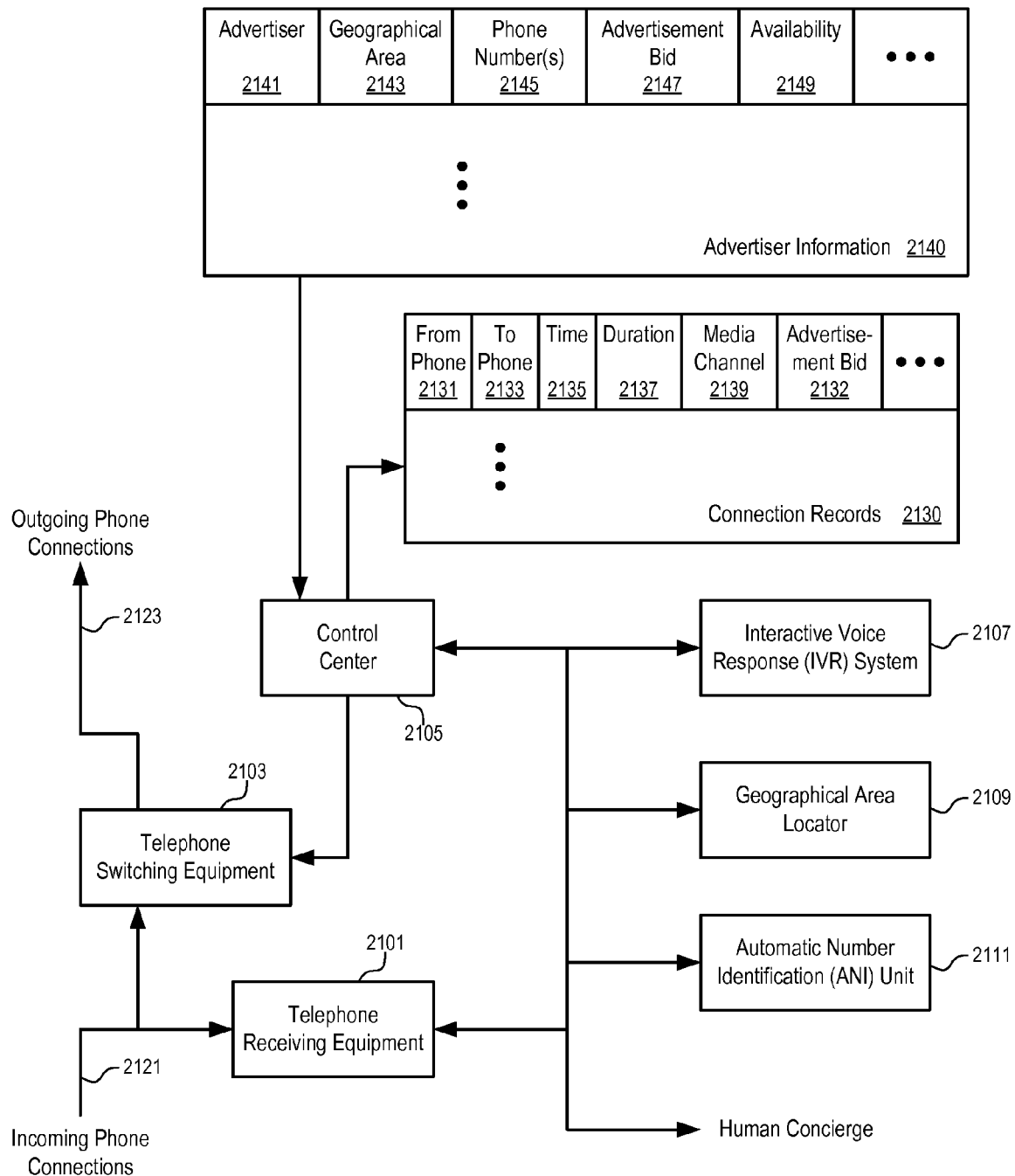
FIG. 21 shows a diagram of a telephone connection system for offline selection of advertisers according to one embodiment of the present invention.

FIG. 21 shows a diagram of a telephone connection system for offline selection of advertisers according to one embodiment of the present invention.

In FIG. 21, when a user calls an advertised telephone number, the phone call is connected to the telephone receiving equipment (2101). The telephone receiving equipment (2101) is connected to the control center (2105) to operate the telephone switching equipment (2103), which selectively connects incoming phone connections (2121) from the users and outgoing phone connections (2123) to the winning advertisers.

In one embodiment, the telephone receiving equipment (2101) and the telephone switching equipment (2103) are circuit switched, including Private Branch Exchange (PBX) and a dedicated voice network. Alternatively, the telephone receiving equipment (2101) and the telephone switching equipment (2103) may be packet switched, including Internet Protocol (IP) based PBX, a data communication network and a gateway. In general, various telephonic techniques known in the art can be used.

When the telephone receiving equipment (2101) picks up a phone call, the control center (2105) determines whether or not further information is needed and/or can be obtained from the caller. For example, to determine a geographical area of interest, the control center (2105) can instruct the interactive voice response (IVR) system (2107) to prompt the caller to key in the desired zip code. In one embodiment, Interactive Voice Response (IVR) is a telephony technology in which one may use a touch-tone telephone to interact with a database to acquire information from or enter data into the database without the help of a human concierge.

Further, the control center may direct the IVR system (2107) to prompt the caller to specify further criteria based on the advertiser information (2140). For example, when the phone number is for a group of mortgage brokers, the user may be directed to select loan sizes, loan types, etc.

Alternatively, the control center (2105) may instruct the geographic area locator (2109) to determine a geographic area from which the call is initiated. For example, the geographic area locator may use the cellular position system to determine the location of a cellular phone, or use a satellite/pseudolite positioning system to determine the location of a mobile device. Pseudolites are ground-based transmitters signals similar to a Global Positioning System (GPS). Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

A cellular communication system may also determine the location of a cellular phone. For example, the location of a cellular phone can be determined using a method known as Time Difference of Arrival (TDOA) in which the reception times of a cellular signal from a mobile station are measured at several base stations to determine the position of the cellular phone. Alternatively, a method known as Advanced Forward Link Trilateration (AFLT), or Enhanced Observed Time Difference (EOTD), can be used, which measures the reception times of cellular signals from several base stations to the cellular phone. Alternatively, the cellular site, in which the mobile device can communicate to a based station, can be used to determine a rough position of the cellular phone. In general, any method used by a cellular phone provider to get location information (e.g., for emergency service) can be used.

The control center (2105) may also instruct the automatic number identification (ANI) unit (2111) to determine the phone number of the incoming call and look up the geographic area information from the database for the phone numbers.

Alternatively, the control center (2105) may connect the phone call temporally to a human concierge who can help the caller to specify a selection criterion (or criteria).

In one embodiment of the present invention, the control center (2105) uses a number of different types of information to select the winning advertiser based on the advertiser information (2140).

In one embodiment, the advertiser information (2140) include the identities of the advertisers (e.g., 2141), the geographic areas (e.g., 2143) of the advertisers, the phone number(s) (e.g., 2145) of the advertisers, the placement bids (e.g., 2147) of the advertisers, the availability statuses (e.g., 2149) of the advertisers, etc. In an alternative embodiment, more or less fields can be used for the advertiser information. For example, keywords of the advertisements and/or categories of the products and/or services advertised in the advertisements can be included in the database of advertiser information.

The availability may include the information about the projected waiting time for a caller to get through. The availability may also depend on the advertisement budget specified by the advertiser. For example, the advertiser may specify the advertisement budget in terms of the maximum number of calls in a day, the minimum time intervals between two calls, working hours, etc.

In one embodiment, in view of the caller's implicitly or explicitly specified requirements (e.g., the geographic area, the loan type, loan size, etc., if there is any), the control center ranks the advertisers according to the current advertiser information. For example, the control center may eliminate the advertisers that are not available or do not meet the caller's requirements and sort the remaining candidates according to the bid for advertisement. The highest bidder in the remaining candidates is the winner. Alternatively, other types of sorting criteria can be used. For example, an indicator of the degree of matching between the caller's requirements can be weighted according to the advertisement bid to generate an indicator for selecting the winner.

After the winning advertiser is determined, the control center (2105) can instruct the telephone switching equipment (2103) to connect the incoming phone call to the phone number of the winning advertiser. The control center (2105) then creates a record entry in connection records (2130) to indicate the connection made for the advertiser. For example, a record entry may include information such as the from phone number (2131), the to phone number (2133), the time the connection is made (2135), the duration of the connection (2137), the media channel (2139) responsible for delivering the advertisement to the caller, the advertisement bid (2132) of the advertiser at the time of the connection, etc. Other information, such as whether or not a human concierge is involved, can also be recorded. In an alternative embodiment, more or less fields can be used for the connection records.

In one embodiment, the recorded connection information is used to generate invoice to bill the advertisers. An account of the advertiser may be debited automatically for the connection. Alternatively, a payment for the advertisement is collected automatically through an electronic system for the connection.

Figure 22:
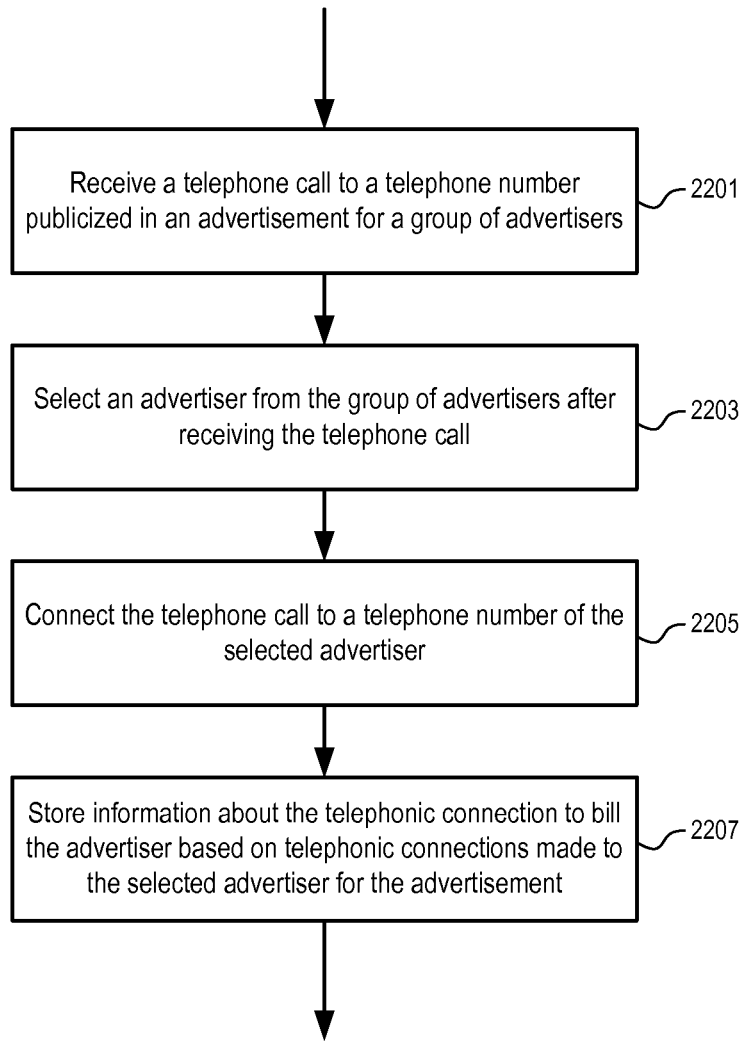
FIGS. 22-25 show flow diagrams of making and tracking phone connections according to embodiments of the present invention.
Figure 23:
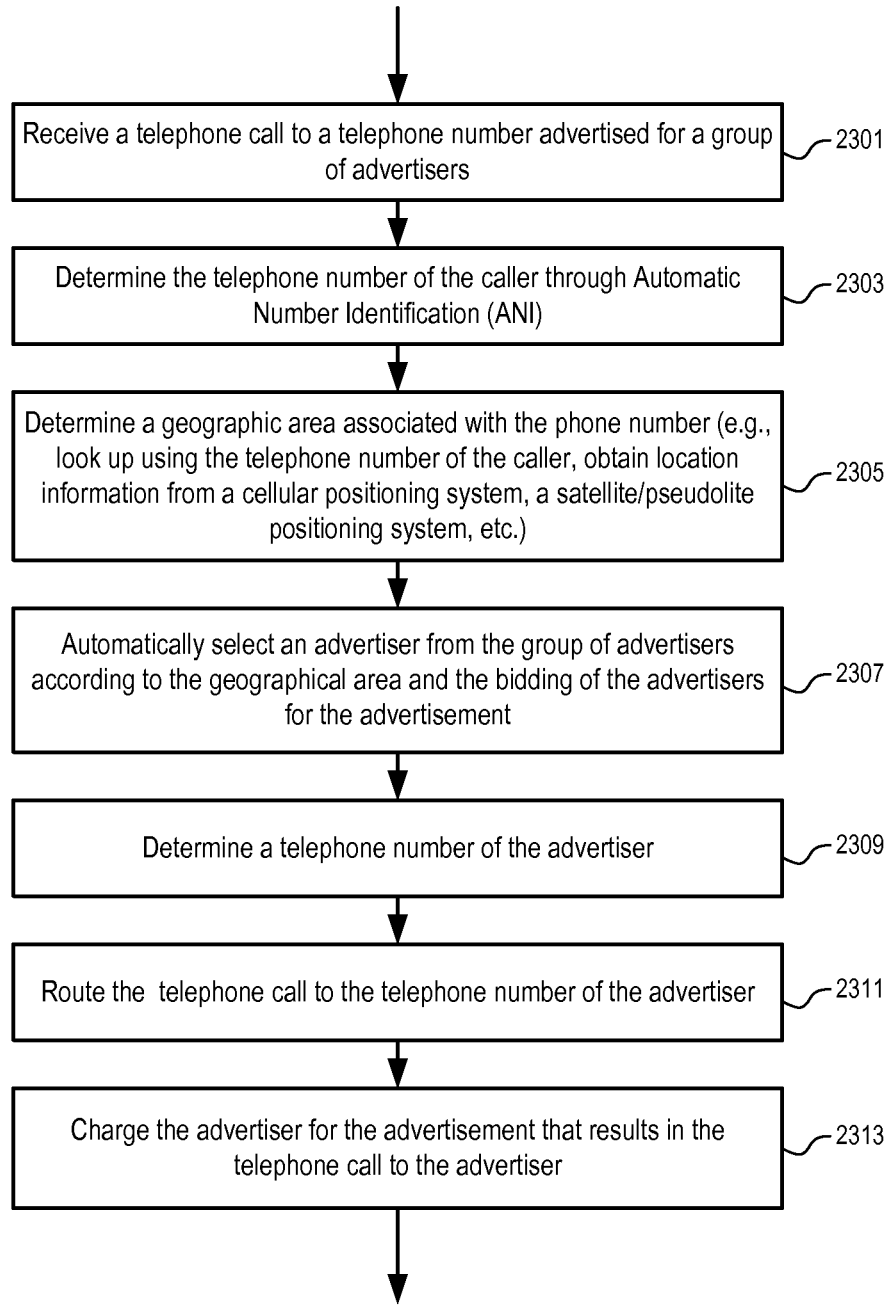
Figure 24:
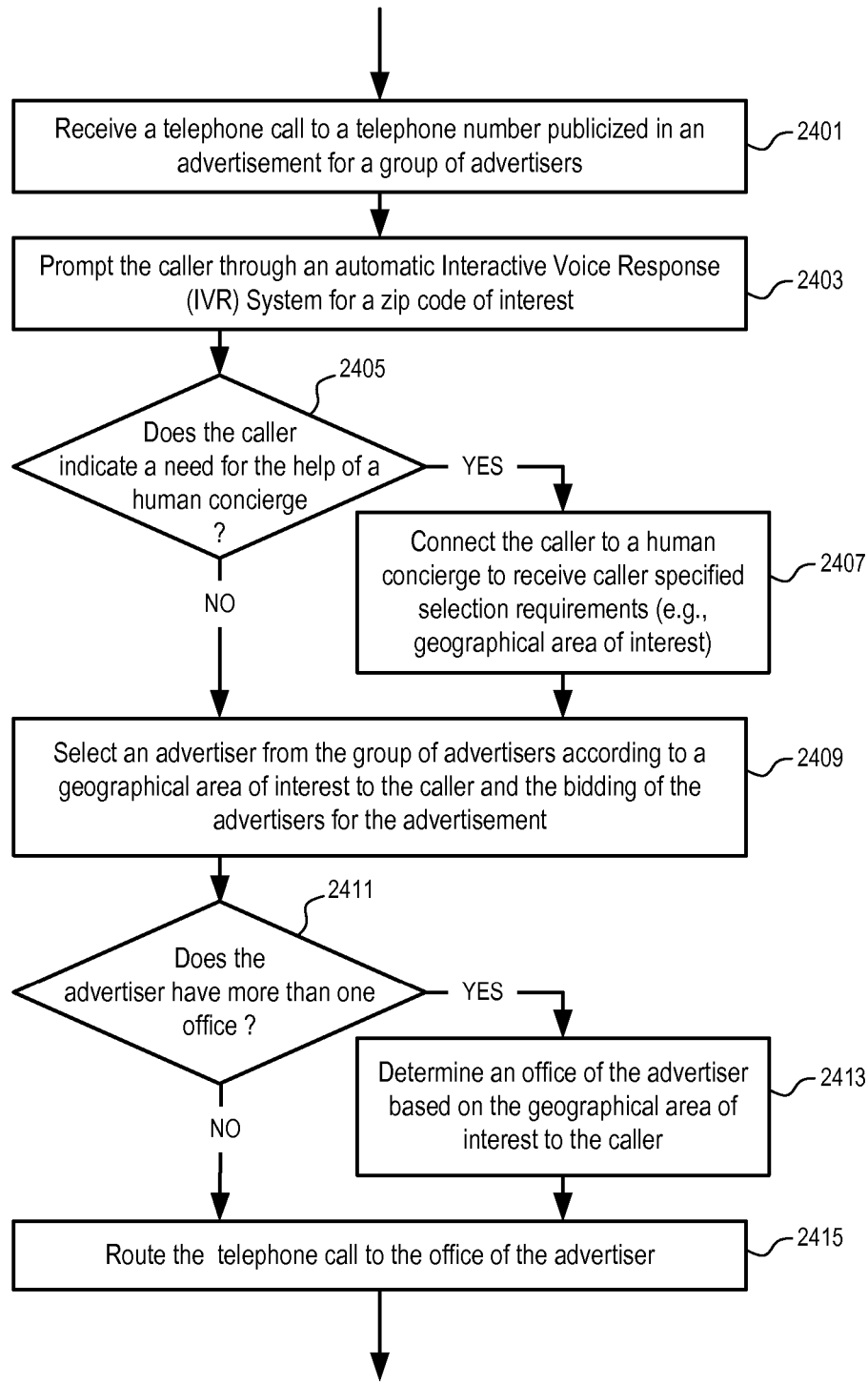

FIGS. 22-24 show flow diagrams of making and tracking phone connections according to embodiments of the present invention.

In FIG. 22, operation 2201 receives a telephone call to a telephone number publicized in an advertisement for a group of advertisers. Operation 2203 selects an advertiser from the group of advertisers after receiving the telephone call. Operation 2205 connects the telephone call to a telephone number of the selected advertiser. Operation 2207 stores information about the telephonic connection to bill the advertiser based on telephonic connections made to the selected advertiser for the advertisement. In one embodiment, the geographic area of interest to the caller is determined, which is used in selecting the advertiser as the receiver of the telephone call.

In FIG. 23, after operation 2301 receives a telephone call to a telephone number advertised for a group of advertisers, operation 2303 determines the telephone number of the caller through Automatic Number Identification (ANI). Operation 2305 determines a geographic area associated with the phone number (e.g., look up using the telephone number of the caller, obtain location information from a cellular positioning system, a satellite/pseudolite positioning system, etc.). Operation 2307 automatically selects an advertiser from the group of advertisers according to the geographical area and the bidding of the advertisers for the advertisement. Operation 2309 determines a telephone number of the advertiser. Operation 2311 routes the telephone call to the telephone number of the advertiser. Operation 2313 charges the advertiser for the advertisement that results in the telephone call to the advertiser.

For example, in one embodiment, the system looks at the phone number (obtained through ANI) of the incoming call and automatically routes it to the highest bidding mortgage broker in the geographic area of the phone number.

In FIG. 24, after operation 2401 receives a telephone call to a telephone number publicized in an advertisement for a group of advertisers, operation 2403 prompts the caller through an automatic Interactive Voice Response (IVR) System for a zip code of interest.

If operation 2405 determines that the caller indicates a need for the help of a human concierge, operation 2407 connects the caller to a human concierge to receive caller specified selection requirements (e.g., geographical area of interest, loan type, loan size, etc.).

Operation 2409 selects an advertiser from the group of advertisers according to a geographical area of interest to the caller and the bidding of the advertisers for the advertisement.

If operation 2411 determines that the advertiser has more than one office, operation 2413 determines an office of the advertiser based on the geographical area of interest to the caller.

Operation 2415 routes the telephone call to the office of the advertiser.

For example, in one embodiment, a customer is prompted on the telephone by an automatic IVR to key in the desired zip code. The system then routes the call to the highest bidding mortgage broker in that geographic area.

For example, in one embodiment, the customer is connected to a human concierge who asks for the desired geographic area and routes the call to the highest bidding mortgage broker in the desired geographic area.

For example, in one embodiment, a large national account which has local regional offices around the country, geography is ascertained using one of the above discussed methods and the call is then routed to the local office that best matches the geography.

In one embodiment of the present invention, an advertisement is for one single advertiser that has a number of different locations. The selection of the location of the advertiser and the corresponding target phone number is made at the time a phone call is received at a switch/router; and the selection may be automatic based on ANI or location information determined from a positioning system, or semi-automatic based on user interaction with an automated IVR, or non-automatic based on the user interaction with a human concierge. Alternatively, the advertisement can be for a group of different advertisers, some of which have different locations/branches in a large geographic area (e.g., a country, around the world, etc.).

In one embodiment, before an incoming call is connected to a selected advertiser (e.g., selected according to price bids of the advertisers for the phone lead, and/or a geographic location/area, and/or other criteria which may be explicitly or implicitly specified by the caller, etc.), no further advertisement information is presented in the telephone call to the caller. In one embodiment, no input is required from the caller to connect the incoming call, which is connected by the server to the highest bidding advertiser of the group associated with the telephone number that the caller dialed.

Alternatively, in one embodiment, further advertisement information may be presented to the caller on behalf of the individual advertisers, after the phone call from the caller is received and before the phone call is forwarded/routed/connected/bridged to an advertiser, to assist the caller in selecting an advertiser from a set of candidates. In one embodiment, detailed, differentiating advertisements are delivered to the callers who are already in the process of making a telephonic connection to one of the advertisers (e.g., service providers).

In one embodiment, advertisements for the individual advertisers are to be presented as voice/audio messages transmitted over the telephonic connection between the server and the caller, before the server further connects the call to a selected advertiser. For example, one or more advertisements as in the form of a pre-recorded voice message, and/or the output of a speech synthesizer using a text-to-speech system, can be presented to the caller over the telephonic connection.

Alternatively, in one embodiment, advertisements for the individual advertisers are presented in a visual form to the caller through the telephone connection, or through a separate data connection.

For example, through the telephone connection, a data stream can be provided from the server to the user device of the caller to present a document, or a user interface, that shows one or more listings of advertisers so that the user can select one to connect. For example, when the telephonic connection between the caller and the server is based on a Voice over Internet Protocol (VoIP) system, the server can provide the data stream to the terminal used by the caller to show advertisements, such as displaying the advertisements within a window of the VoIP client application, or within a separate web browser window.

In one embodiment, a VoIP phone is designed to display messages in additional to transmitting the voice/audio messages. For example, the VoIP phone is designed to receive and display video images or still images during the phone connection. Advertisements/listings can be presented as video images or still images. For example, the VoIP phone can be designed to receive and display data (e.g., text message, web page, WAP page, or data of a custom application). The server can stream the advertisement data to the VoIP phone over the connection for display.

In one embodiment, the selection of the caller is transmitted to the server as a voice/audio message. For example, according to the visual and/or the voice/audio presentation of the advertisements/listings, the caller can make the selection using a voice command (e.g., say an ID number of the advertisements/listings, or the name of the listings), or pressing a key to generate an audio signal (e.g., a Dual Tone Multi-Frequency (DTMF) signal) to indicate the selection.

Alternatively, in one embodiment, the selection of the caller is transmitted in a digital form, such as a text message, a web request, a WAP request, or a request in a custom communication protocol (e.g., SIP) when a custom application is used to display the advertisements/listings.

For example, a VoIP phone is designed to transmit data generated according to user input received at the input device of the phone (e.g., a touch screen, a keyboard, a keypad, etc.) After the caller views the advertisements/listings during the phone call, the caller can make a selection (e.g., click) to request the connection to the corresponding advertiser.

Further, a phone designed for a circuit switched network can also be designed to have at least some of the communications capabilities via the telephonic connection discussed above. For example, a phone for a circuit switched network can have a circuitry to detect audio signals that represents data transmitted over the phone connection and display the advertisements/listings according to the data received.

In one embodiment, the advertisements/listings are presented over a data connection separate from the telephonic connection. For example, a data-enabled phone (e.g., a cellular phone, a mobile phone, a Bluetooth phone, a software phone, etc.) can establish a separate data connection with the server to allow the display of the advertisements/listings. For example, the data-enable phone can have an application designed to display the advertisements/listings when the phone number of the server is dialed. The advertisements/listings may be pre-loaded, or downloaded after the dialing of the phone number of the server. In one embodiment, the data connection is a two-way communication channel, which allows the phone to transmit the user selection and/or other user input (e.g., search criteria) in a digital format.

In one embodiment, the server selectively determines one or more candidates. A representation of the candidates is then presented to the caller for selection/confirmation. The representation can be delivered for visual and/or audio presentation.

In one embodiment, the candidates are selected at least partially based on the price bids of the advertisers. In one embodiment, the selection of the candidates is further based on a search request of the caller. For example, the caller may ask for a particular advertiser by name; and the server can then determine the requested advertiser and one or more alternative advertisers that are similar to the requested advertiser. For example, the caller may specify a price range charged by the service providers; and the server can then determine one or more candidates based on the price range and price bides of the advertisers.

In one embodiment, the telephone number of the server is advertised for a group of advertisers (e.g., "Call 1-800-PLUMBER for plumbers in your area", "Call 1-800-MYLOCAL for top local merchants in your neighborhood: plumbing, roofing, taxi, pizza, etc."), and/or for the capability of the server to determine an advertiser requested over the phone.

For example, after the caller calls the telephone number of the server, the caller may specify one or more criteria to search for a suitable advertiser/service provider. After the search is performed, the server presents one or more listings/advertisements of the candidates to the phone of the caller for display. The caller can select a desired one to connect or request more candidates. Alternatively, the candidates can be read out to the caller one at a time for the user to select. In one embodiment, the presentation sequence, or position, of the candidates are at least partially determined by the price bids of the candidates for the phone lead.

Figure 25:
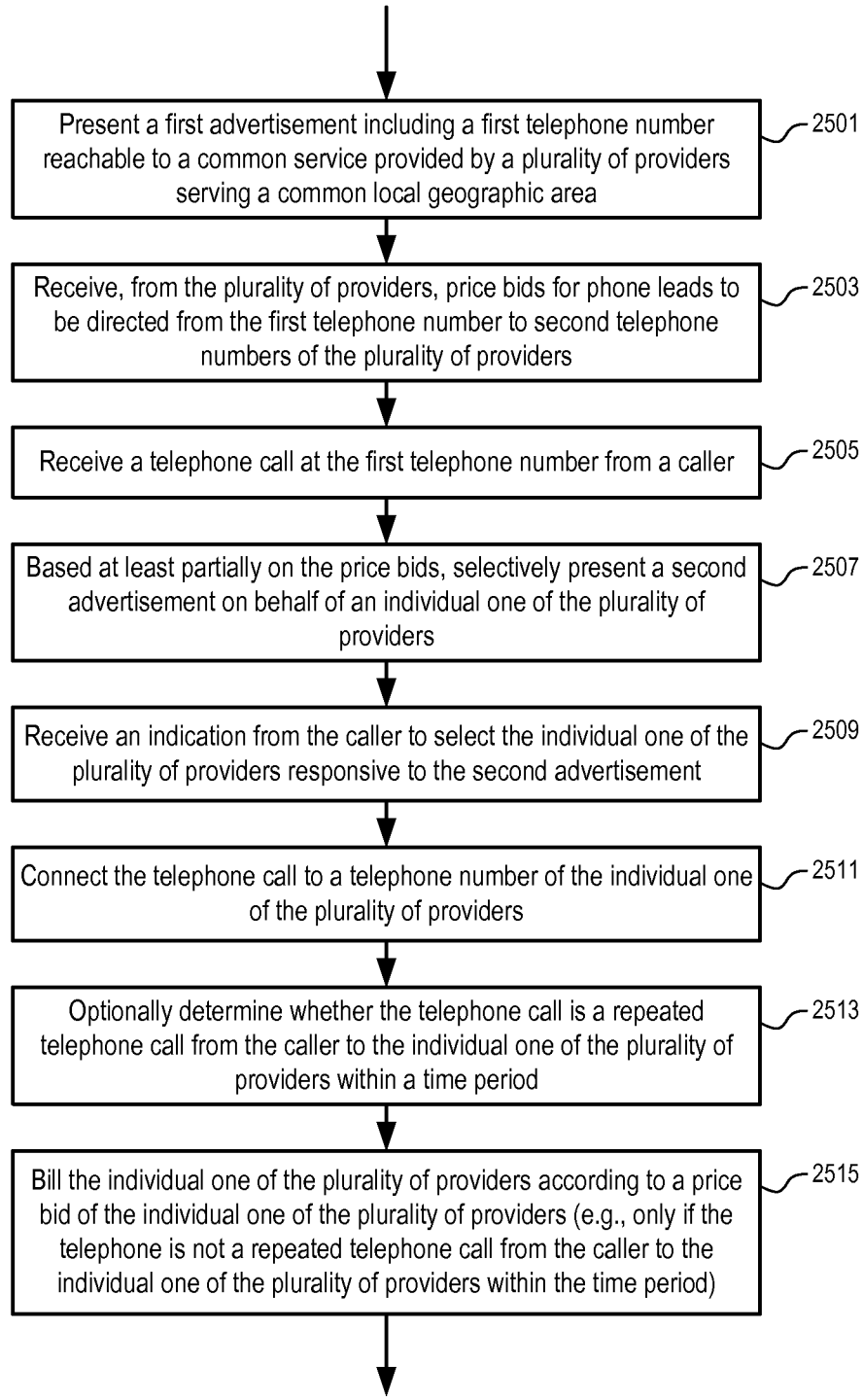

FIG. 25 shows a flow diagram of making phone connections according to one embodiment of the present invention. In FIG. 25, operation 2501 presents a first advertisement including a first telephone number reachable to a common service provided by a plurality of providers serving a common local geographic area. The advertisement may be presented in a variety of media channels, such as web pages, emails, books, magazines, newspapers, television programs, text messages, multi-media messages, instant messages, billboards, refrigerator magnets, etc. In one embodiment, the first advertisement does not specifically identify any individual of the providers. In one embodiment, the first advertisement does not specifically represent any individual providers. In one embodiment, the first advertisement identifies a portion of the providers as examples. In one embodiment, the first advertisement identifies and describes the providers as a whole.

In one embodiment, the first telephone number is designed to reach a variety of callees based on a search request presented by the caller after telephonic connection between the caller and the server is established.

From the plurality of providers, operation 2503 receives price bids for phone leads to be directed from the first telephone number to second telephone numbers of the plurality of providers. In one embodiment, the price bids are used to rank the similar advertisers selective presentation to the caller of the first telephone number. For example, the price bids may be used to select the top one or two of currently available providers for presentation to the caller. The providers who are not currently available to talk to the caller may be excluded from the list, or be presented after a further request from the caller.

In one embodiment, the availability information of the providers to talk to the caller is collected from the providers. For example, the providers may specify the schedule (e.g., hours and days) for taking the calls and/or specify the current availability information through a communication channel (e.g., a phone line, a web page, a short message/SMS message, etc.).

In one embodiment, the price bids are used to compute a ranking indicator to sort and select the top candidates for the caller.

For example, after operation 2505 receives a telephone call at the first telephone number from a caller, operation 2507 selectively presents a second advertisement on behalf of an individual one of the plurality of providers, based at least partially on the price bids. In one embodiment, the second advertisement is specific for an individual provider. In one embodiment, the server may provide more or less advertisement/listing information depending on the preference of the caller. For example, the server may present a list of names of the providers, or present a list of names with brief descriptions, or present a list of names with discount offers from the corresponding providers, or a present a list of names with detailed advertisements of the corresponding providers.

In one embodiment, the advertisements for multiple providers are presented sequentially (e.g., as output of a speech synthesizer one after another, or as flash cards one after another, or as a scrolling list), or substantially simultaneously with different positions on a display (e.g., as a text listing, a web page, a WAP page, etc.).

After operation 2509 receives an indication from the caller to select the individual one of the plurality of providers responsive to the second advertisement, operation 2511 connects the telephone call to a telephone number of the individual one of the plurality of providers.

Optionally, operation 2513 determines whether the telephone call is a repeated telephone call from the caller to the individual one of the plurality of providers within a time period. In one embodiment, the provider is waived charges for leads (calls) from searchers/customers who have called recently (e.g., within an hour, a day, a week, etc.).

Operation 2517 bills the individual one of the plurality of providers according to a price bid of the individual one of the plurality of providers (e.g., only if the telephone is not a repeated telephone call from the caller to the individual one of the plurality of providers within the time period).

In one embodiment, after a telephone call is received at a second telephone number from a caller, the telephone call is connected to a first telephone number of a first entity who provides a price bid for a phone lead to be directed to the first telephone number of the first entity. The first entity is then billed for the telephone call connected to the first telephone number according to the price bid in response to a determination that the telephone is not a repeated telephone call from the caller to the first entity within a time period.

In one embodiment, after an input is received from the caller during the telephone call, the first telephone number of the first entity is determined based at least partially on the input from the caller. For example, the input from the caller can specify one or more criteria which can be used to select the first telephone number from a plurality of telephone numbers of different entities.

In one embodiment, options are displayed to the caller for the selection of one from the plurality of telephone numbers of different entities during the telephone call. For example, a list of advertisements/listings are transmitted to the caller for selection during the telephone call. The transmission may be through the same telephonic connection between the caller and the server or a separate data connection.

In one embodiment, one or more advertisements, including an advertisement of the first entity, are presented individually for one or more advertisers during the telephone call and prior to connecting, such that the caller has the opportunity to select one.

In one embodiment, prior to the telephone call, an advertisement including the second telephone number is presented on behalf of a plurality of entities as a whole on a media channel, such as in a web page, email, book, magazine, newspaper, television program, text message, multi-media message, instant message, or on a billboard, refrigerator magnet, etc.

In one embodiment, the second telephone number is presented in an advertisement on behalf of a plurality of entities.

A plurality of price bids are received from the plurality of entities, which can be used to rank the advertisers in making individual presentations for the advertisers during the telephone call. After the call is successfully connected to the first telephone number of the first entity, the first entity is billed for the telephone call connected to the first telephone number according to the price bid, in response to the determination that the telephone is not a repeated telephone call from the caller to the first entity within the time period. In one embodiment, the time period is predetermined and in the order of hour, day, or week.

In one embodiment, the caller can specify an indication of a geographical area of interest to the caller so that the server can select the plurality of entities that service the geographical area of interest to the caller. For example, the caller can provide a zip code over the telephone connection to indicate the geographical area to the server.

In one embodiment, a geographical location of the caller from the telephone call is determined to determine a geographical area of interest to the caller. The geographical location of the caller can be determined based on an Automatic Number Identification (ANI) service, a cellular positioning system, or a satellite positioning system.

In one embodiment, the advertisement advertises a common service provided by a plurality of entities in a specific geographic area, such as Los Angeles.

In one embodiment, information, such as brief description, discount information, qualification summary, etc., is received from the first entity and presented to the caller during the telephone call on behalf of the first entity. The caller can provide a selection indication in response to receiving such information.

In one embodiment, a search request is received from the caller during the telephone call and before the telephone call is connected to the first telephone number. After a search is performed according to the search request, the search result is selectively presented to the caller. When the user selects an item in the search result which corresponds to the first telephone number, the telephone call is connected to the first telephone number. In one embodiment, the search result is selectively presented on behalf of the first entity based at least partially on the price bid.

In one embodiment, the telephone call is connected to the first telephone number without revealing the first telephone number to the caller. For example, the server makes a separate phone call to the first telephone number and then joins the call from the caller with the separate phone call to connect the caller and the first entity. Alternatively, the first telephone number can be provided to the caller during the phone call so that the caller may avoid calling the second telephone number to reach the first entity.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
   receiving, via a computing device, a plurality of price bids from each of a plurality of entities;
   presenting, via the computing device, a second telephone number in an advertisement on behalf of the plurality of entities;
   receiving, via the computing device, a telephone call at the second telephone number from a caller;
   in response to receiving the telephone call:
      processing a set of status information corresponding to the plurality of entities, the set of status information comprising status indicators each indicating whether a respective entity of the plurality of entities is currently available to talk to the caller, wherein the status indicators comprise a first status indicator indicating that a first entity of the plurality of entities is not currently available to talk to the caller;
      based at least in part on the set of status information, excluding the first entity from a subset of the plurality of entities and identifying one or more entities from the plurality of entities that are currently available to talk to the caller, the one or more entities corresponding to the subset of the plurality of entities that excludes the first entity; and
      presenting, via the telephone call, respective information relating to each of the one or more available entities, wherein the respective information relating to each of the one or more available entities is presented ranked in an order determined by the respective price bid of the respective entity;
   receiving a search request from the caller during the telephone call, the search request including one or more criteria specified by the caller to search for a suitable one of the plurality of entities;
   performing a search according to the search request;
   presenting a result of the search to the caller, the result comprising listings for at least some of the one or more available entities including a first entity;
   receiving, via the telephone call, a selection of a first listing from the result by the caller that corresponds to a first telephone number of the first entity of the one or more available entities; and
   in response to the selection by the caller, connecting the telephone call to the first telephone number of the first entity.

2. The method of claim 1, further comprising:
   determining whether the telephone call is a repeated telephone call from the caller to the first entity within a time period; and
   billing the first entity for the telephone call according to the respective price bid associated with the first entity in response to a determination that the telephone call is not a repeated telephone call from the caller to the first entity within the time period.

3. The method of claim 2, wherein the advertisement advertises a common service provided by one or more entities of the plurality of entities in a specific geographic area, and wherein the time period is predetermined to be one of an hour, a day, or a week.

4. The method of claim 1, further comprising:
   receiving an input, via the telephone call, that includes an indication of a geographical area of interest to the caller and one or more of the plurality of entities that service the geographical area of interest to the caller.

5. The method of claim 1, further comprising:
   determining a geographical location of the caller from the telephone call to determine a geographical area of interest to the caller.

6. The method of claim 5, wherein determining the geographical location of the caller is based on at least one of an automatic number identification service, a cellular positioning system, or a satellite positioning system.

7. The method of claim 1, wherein the telephone call is connected to the first telephone number without revealing the first telephone number to the caller.

8. The method of claim 1, further comprising excluding, from the presentation to the user via the telephone call, information related to an entity of the plurality of entities that is not available to talk to the caller.

9. The method of claim 1, further comprising:
   in response to a request from the caller via the telephone call, presenting information related to an entity of the plurality of entities that is not available to talk to the caller.

10. The method of claim 1, further comprising collecting availability information for one or more of the plurality of entities, wherein the identification of the one or more available entities is based at least partially on the collected availability information.

11. A non-transitory computer-readable medium storing instructions that, when executed by a computing device, cause the computing device to:
   receive a plurality of price bids from each of a plurality of entities;
   present a second telephone number in an advertisement on behalf of the plurality receive, via the computing device, a telephone call at the second telephone number from a caller;
   in response to receiving the telephone call:
      process a set of status information corresponding to the plurality of entities, the set of status information comprising status indicators each indicating whether a respective entity of the plurality of entities is currently available to talk to the caller, wherein the status indicators comprise a first status indicator indicating that a first entity of the plurality of entities is not currently available to talk to the caller;
      based at least in part on the set of status information, exclude the first entity from a subset of the plurality of entities and identify one or more entities from the plurality of entities that are available to talk to the caller, the one or more entities corresponding to the subset of the plurality of entities that excludes the first entity; and present, via the telephone call, respective information relating to each of the one or more available entities, wherein the respective information relating to each of the one or more available entities is presented ranked in an order determined by the respective price bid of the respective entity;

receive a search request from the caller during the telephone call, the search request including one or more criteria specified by the caller to search for a suitable one of the plurality of entities;

perform a search according to the search request;

present a result of the search to the caller, the result comprising listings for at least some of the one or more available entities including a first entity;

receive, via the telephone call, a selection of a first listing from the result by the caller that corresponds to a first telephone number of the first entity; and in response to the selection by the caller, connect the telephone call to the first telephone number of the first entity.

12. The computer-readable medium of claim 11, wherein the instructions further cause the computing device to:

determine whether the telephone call is a repeated telephone call from the caller to the first entity within a time period; and bill the first entity of the plurality of entities for the telephone call according to the respective price bid associated with the first entity in response to a determination that the telephone call is not a repeated telephone call from the caller to the first entity within the time period.

13. A system, comprising:

at least one processor; and memory storing instructions configured to instruct the at least one processor to:

receive a plurality of price bids from each of plurality of entities;

present a second telephone number in an advertisement on behalf of the plurality of entities;

receive a telephone call at the second telephone number from a caller;

in response to receiving the telephone call:

process a set of status information corresponding to the plurality of entities, the set of status information comprising status indicators each indicating whether a respective entity of the plurality of entities is currently available to talk to the caller, wherein the status indicators comprise a first status indicator indicating that a first entity of the plurality of entities is not currently available to talk to the caller;

based at least in part on the set of status information, exclude the first entity from a subset of the plurality of entities and identify one or more entities from the plurality of entities that are available to talk to the caller, the one or more entities corresponding to the subset of the plurality of entities that excludes the first entity; and present, via the telephone call, respective information relating to each of the one or more available entities, wherein the respective information relating to each of the one or more available entities is presented ranked in an order determined by the respective price bid of the respective entity;

receive a search request from the caller during the telephone call, the search request including one or more criteria specified by the caller to search for a suitable one of the plurality of entities;

perform a search according to the search request;

present a result of the search to the caller, the result comprising listings for at least some of the one or more available entities including a first entity;

receive, via the telephone call, a selection of a first listing from the result by the caller that corresponds to a first telephone number of the first entity; and in response to the selection by the caller, connect the telephone call to the first telephone number of the first entity.

14. The system of claim 13, wherein the instructions are further configured to instruct the at least one processor to:

determine whether the telephone call is a repeated telephone call from the caller to the first entity of the plurality of entities within the time period; and bill the first entity for the telephone call according to the respective price bid associated with the first entity in response to a determination that the telephone call is not a repeated telephone call from the caller to the first entity within the time period.

* * * * *